United States Patent
Molyneaux et al.

(10) Patent No.: US 11,423,602 B2
(45) Date of Patent: Aug. 23, 2022

(54) FAST 3D RECONSTRUCTION WITH DEPTH INFORMATION

(71) Applicant: Magic Leap, Inc., Plantation, FL (US)

(72) Inventors: David Geoffrey Molyneaux, San Jose, CA (US); Frank Thomas Steinbruecker, Mountain View, CA (US); Shiyu Dong, Santa Clara, CA (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 16/986,876

(22) Filed: Aug. 6, 2020

(65) Prior Publication Data
US 2021/0042988 A1    Feb. 11, 2021

Related U.S. Application Data

(60) Provisional application No. 62/883,851, filed on Aug. 7, 2019.

(51) Int. Cl.
*G06T 15/08*     (2011.01)
*G06T 7/521*     (2017.01)
*G06T 19/20*    (2011.01)
*G06T 15/40*    (2011.01)

(52) U.S. Cl.
CPC .............. *G06T 15/08* (2013.01); *G06T 7/521* (2017.01); *G06T 15/40* (2013.01); *G06T 19/20* (2013.01);
(Continued)

(58) Field of Classification Search
CPC ......... G06T 15/08; G06T 7/521; G06T 15/40; G06T 19/20; G06T 2207/10028; G06T 2219/2008
See application file for complete search history.

(56) References Cited

U.S. PATENT DOCUMENTS

| | | | |
|---|---|---|---|
| 2010/0208994 A1* | 8/2010 | Yao | G06T 5/005 |
| | | | 382/173 |
| 2012/0194516 A1* | 8/2012 | Newcombe | G06T 17/00 |
| | | | 345/420 |

(Continued)

OTHER PUBLICATIONS

Invitation to Pay Additional Fees dated Oct. 8, 2020 in connection with International Application No. PCT/US2020/045135.

(Continued)

*Primary Examiner* — Terrell M Robinson
(74) *Attorney, Agent, or Firm* — Wolf, Greenfield & Sacks, P.C.

(57) ABSTRACT

A method to reconstruct an environment with depth information is provided. The method makes available to a wide variety of XR applications fresh and accurate 3D reconstruction data of environments with low processing time and low usage of computational resources and storage spaces. The method includes capturing depth information about an environment upon a change within a field-of-view of a user caused by, for example, motions of headpose, user location, and/or objects, and updating a representation of the environment based on depths associated with different confidence levels by the captured depth information. The method may include updating a geometry of the environment based on depths associated with confidence levels higher than a threshold. The method may include, upon a change of the 3D environment, inferring the removal of surfaces in the environment based on depths associated with confidence levels lower than the threshold.

22 Claims, 17 Drawing Sheets

(52) U.S. Cl.
CPC .............. *G06T 2207/10028* (2013.01); *G06T 2219/2008* (2013.01)

(56) References Cited

U.S. PATENT DOCUMENTS

| | | | |
|---|---|---|---|
| 2014/0111507 A1* | 4/2014 | Kim ........................ | G06T 17/00 345/419 |
| 2016/0267717 A1* | 9/2016 | Bar-Zeev .................. | G06T 7/70 |
| 2016/0335809 A1* | 11/2016 | Forutanpour ........... | G06T 5/005 |
| 2017/0046868 A1* | 2/2017 | Chernov ................. | G06T 7/246 |
| 2017/0243352 A1* | 8/2017 | Kutliroff ............... | G06T 19/006 |
| 2018/0106891 A1 | 4/2018 | Thurner | |
| 2018/0211398 A1 | 7/2018 | Schmidt | |
| 2019/0197774 A1 | 6/2019 | Molyneaux et al. | |
| 2019/0197777 A1 | 6/2019 | Steinbrucker et al. | |

OTHER PUBLICATIONS

Curless et al., A Volumetric Method for Building Complex Models from Range Images. SIGGRAPH 1996. 10 pages.
PCT/US2020/045135, Oct. 8, 2020, Invitation to Pay Additional Fees.
International Search Report and Written Opinion dated Dec. 8, 2020 in connection with International Application No. PCT/US2020/045135.
International Preliminary Report on Patentability dated Feb. 17, 2022 in connection with International Application No. PCT/US2020/045135.

* cited by examiner

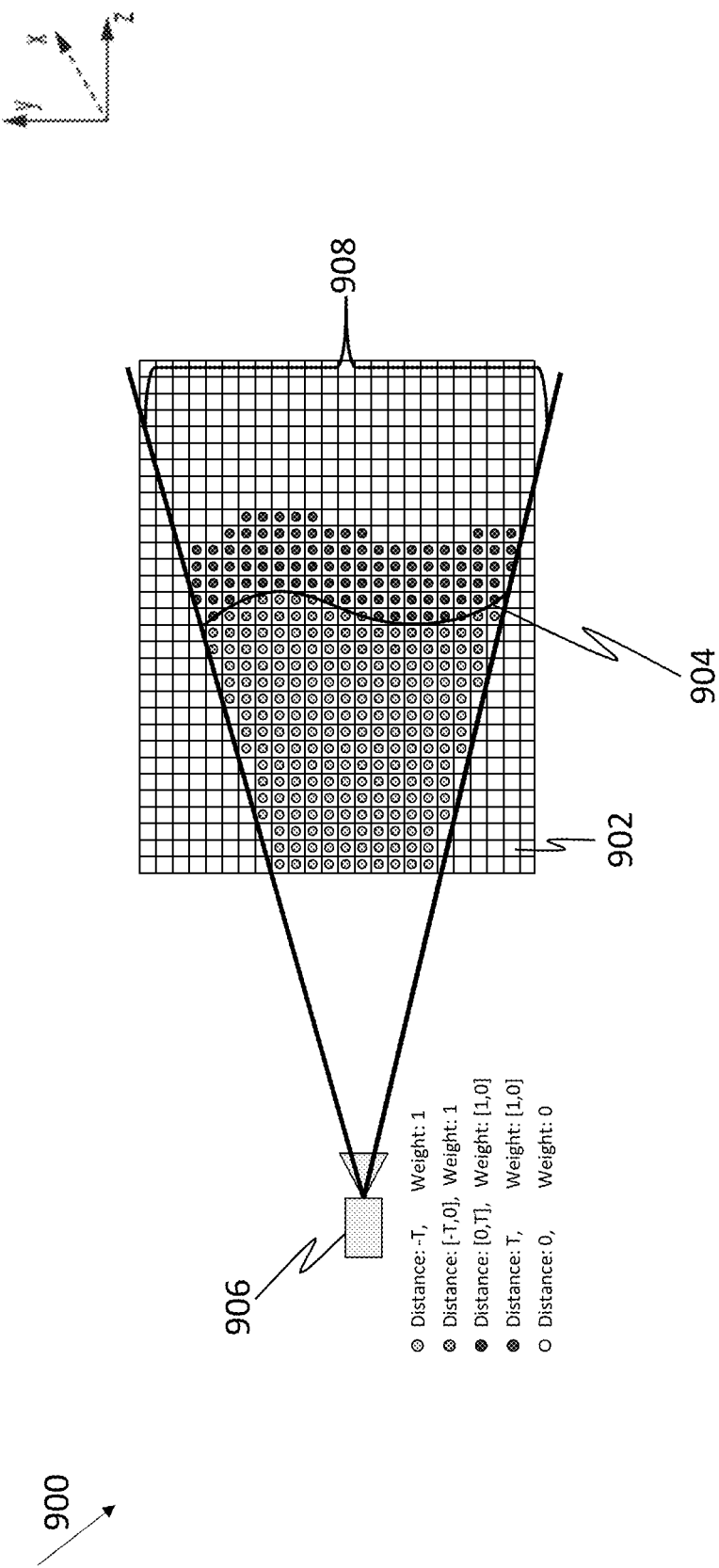

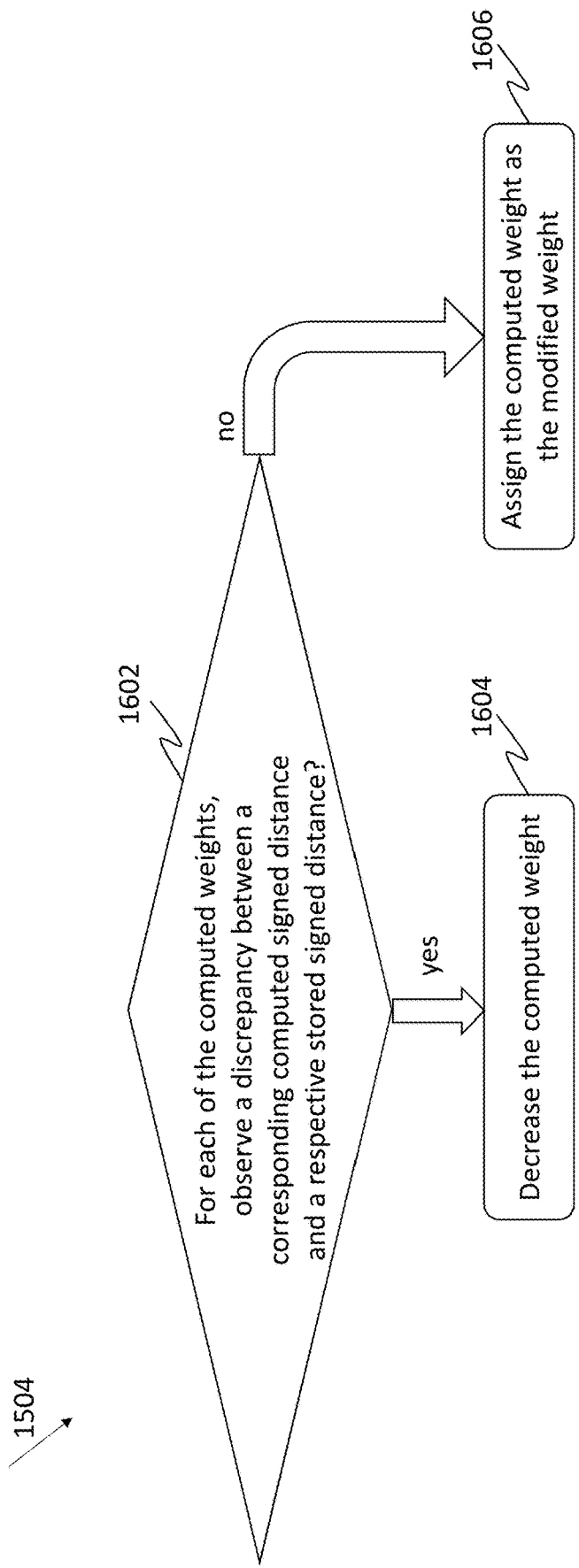

FAST 3D RECONSTRUCTION WITH DEPTH INFORMATION

RELATED APPLICATIONS

This application claims priority to and the benefit of U.S. Provisional Patent Application Ser. No. 62/883,851, filed Aug. 7, 2019 and entitled "FAST 3D RECONSTRUCTION WITH DEPTH INFORMATION," which is hereby incorporated herein by reference in its entirety.

TECHNICAL FIELD

This application relates generally to cross reality systems that use a three-dimensional (3D) reconstruction to render scenes.

BACKGROUND

Computers may control human user interfaces to create an X Reality (XR or cross reality) environment in which some or all of the XR environment, as perceived by the user, is generated by the computer. These XR environments may be virtual reality (VR), augmented reality (AR), and mixed reality (MR) environments, in which some or all of an XR environment may be generated by computers using, in part, data that describes the environment. This data may describe, for example, virtual objects that may be rendered in a way that users sense or perceive as a part of a physical world and can interact with the virtual objects. The user may experience these virtual objects as a result of the data being rendered and presented through a user interface device, such as, for example, a head-mounted display device. The data may be displayed to the user to see, or may control audio that is played for the user to hear, or may control a tactile (or haptic) interface, enabling the user to experience touch sensations that the user senses or perceives as feeling the virtual object.

XR systems may be useful for many applications, spanning the fields of scientific visualization, medical training, engineering design and prototyping, tele-manipulation and tele-presence, and personal entertainment. AR and MR, in contrast to VR, include one or more virtual objects in relation to real objects of the physical world. The experience of virtual objects interacting with real objects greatly enhances the user's enjoyment in using the XR system, and also opens the door for a variety of applications that present realistic and readily understandable information about how the physical world might be altered.

An XR system may represent the physical surface of the world around a user of the system as a "mesh." A mesh may be represented by multiple, interconnected triangles. Each triangle has edges joining points on a surface of an object within the physical world, such that each triangle represents a portion of the surface. Information about the portion of the surface, such as color, texture or other properties may be stored in associate within the triangle. In operation, an XR system may process image information to detect points and surfaces so as to create or update the mesh.

BRIEF SUMMARY

Aspects of the present application relate to methods and apparatus for fast 3D reconstruction with depth information. Techniques as described herein may be used together, separately, or in any suitable combination.

Some embodiments relate to a portable electronic system. The portable electronic system includes a depth sensor configured to capture information about a physical world, and at least one processor configured to execute computer executable instructions to compute a three-dimensional (3D) representation of a portion of the physical world based at least in part on the captured information about the physical world. The computer executable instructions comprise instructions for: computing from the captured information a depth image comprising a plurality of pixels, each pixel indicating a distance to a surface in the physical world; determining valid pixels and invalid pixels in the plurality of pixels of the depth image based, at least in part, on the captured information; updating the 3D representation of the portion of the physical world with the valid pixels; and updating the 3D representation of the portion of the physical world with the invalid pixels.

In some embodiments, computing the depth image comprises computing confidence levels about the distances indicated by the plurality of pixels, and determining the valid pixels and the invalid pixels comprises, for each of the plurality of pixels, determining whether the corresponding confidence level is below a predetermined value, and assigning the pixel as an invalid pixel when the corresponding confidence level is below the predetermined value.

In some embodiments, updating the 3D representation of the portion of the physical world with the valid pixels comprises modifying a geometry of the 3D representation of the portion of the physical world with the distances indicated by the valid pixels.

In some embodiments, updating the 3D representation of the portion of the physical world with the valid pixels comprises adding an object to an object map.

In some embodiments, updating the 3D representation of the portion of the physical world with the invalid pixels comprises removing an object from the object map.

In some embodiments, updating the 3D representation of the portion of the physical world with the invalid pixels comprises removing one or more reconstructed surfaces from the 3D representation of the portion of the physical world based, at least in part, on the distances indicated by the invalid pixels.

In some embodiments, the one or more reconstructed surfaces are removed from the 3D representation of the portion of the physical world when distances indicated by the corresponding invalid pixels are out of an operation range of the sensor.

In some embodiments, the sensor comprises a light source configured to emit light modulated at a frequency; a pixel array comprising a plurality of pixel circuits and configured to detect the reflected light at the frequency by an object; and a mixer circuit configured to compute an amplitude image of the reflected light, indicating amplitudes of the reflected light detected by the plurality of pixel circuits in the pixel array, and a phase image of the reflected light, indicating phase shifts between the reflected light and the emitted light detected by the plurality of pixel circuits in the pixel array. The depth image is computed based, at least in part, on the phase image.

In some embodiments, determining the valid pixels and the invalid pixels comprises, for each of the plurality of pixels of the depth image, determining whether a corresponding amplitude in the amplitude image is below a predetermined value, and assigning the pixel as an invalid pixel when the corresponding amplitude is below the predetermined value.

Some embodiments relate to at least one non-transitory computer-readable medium encoded with a plurality of computer-executable instructions that, when executed by at least one processor, perform a method for providing a three-dimensional (3D) representation of a portion of a physical world. The 3D representation of the portion of the physical world includes a plurality of voxels corresponding to a plurality of volumes of the portion of the physical world. The plurality of voxels store signed distances and weights. The method includes capturing information about the portion of the physical world upon a change within a field-of-view of a user; computing a depth image based on the captured information, the depth image comprising a plurality of pixels, each pixel indicating a distance to a surface in the portion of the physical world; determining valid pixels and invalid pixels in the plurality of pixels of the depth image based, at least in part, on the captured information; updating the 3D representation of the portion of the physical world with the valid pixels; and updating the 3D representation of the portion of the physical world with the invalid pixels.

In some embodiments, the captured information comprises confidence levels about the distances indicated by the plurality of pixels. Determining the valid pixels and invalid pixels comprises, for each of the plurality of pixels, determining whether the corresponding confidence level is below a predetermined value, and assigning the pixel as an invalid pixel when the corresponding confidence level is below the predetermined value.

In some embodiments, updating the 3D representation of the portion of the physical world with the valid pixels comprises computing signed distances and weights based, at least in part, on the valid pixels of the depth image, combining the computed weights with respective stored weights in the voxels and storing the combined weights as the stored weights, and combining the computed signed distances with respective stored signed distances in the voxels and storing the combined signed distances as the stored signed distances.

In some embodiments, updating the 3D representation of the portion of the physical world with the invalid pixels comprises computing signed distances and weights based, at least in part, on the invalid pixels of the depth image. The computing comprises modifying the computed weights based on a time that the depth image is captured, combining the modified weights with respective stored weights in the voxels, and, for each of the combined weights, determining whether the combined weight is above a predetermined value.

In some embodiments, modifying the computed weights comprises, for each of the computed weights, determining whether a discrepancy exists between a computed signed distance corresponding to the computed weight and a respective stored signed distance.

In some embodiments, modifying the computed weights comprises, when it is determined the discrepancy exists, decreasing the computed weight.

In some embodiments, modifying the computed weights comprises, when it is determined no discrepancy exists, assigning the computed weight as the modified weight.

In some embodiments, updating the 3D representation of the portion of the physical world with the invalid pixels comprises, when the combined weight is determined to be above the predetermined value, further modifying the computed weight based on the time that the depth image is captured.

In some embodiments, updating the 3D representation of the portion of the physical world with the invalid pixels comprises, when the combined weight is determined to be below the predetermined value, storing the combined weight as the stored weight, combining a corresponding computed signed distance with a respective stored signed distance, and storing the combined signed distance as the stored signed distance.

Some embodiments relate to a method of operating a cross reality (XR) system to reconstruct a three-dimensional (3D) environment. The XR system includes a processor configured to process image information in communication with a sensor worn by a user that captures information for respective regions in a field of view of the sensor. The image information includes a depth image computed from the captured information. The depth image includes a plurality of pixels. Each pixel indicates a distance to a surface in the 3D environment. The method includes determining the plurality of pixels of the depth image as valid pixels and invalid pixels based, at least in part, on the captured information; updating a representation of the 3D environment with the valid pixels; and updating the representation of the 3D environment with the invalid pixels.

In some embodiments, updating the representation of the 3D environment with the valid pixels comprises modifying a geometry of the representation of the 3D environment based, at least in part, on the valid pixels.

In some embodiments, updating the representation of the 3D environment with the invalid pixels comprises removing a surface from the representation of the 3D environment based, at least in part, on the invalid pixels.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

Figure (FIG. 1 is a sketch illustrating an example of a simplified augmented reality (AR) scene, according to some embodiments.

FIG. 9A is a schematic diagram illustrating a scene represented by voxels, a surface in the scene, and a depth sensor capturing the surface in a depth image, according to some embodiments.

FIG. 16 is a flow chart illustrating an exemplary method of modifying the computed weights in FIG. 15, according to some embodiments.

DETAILED DESCRIPTION

Figure 1:
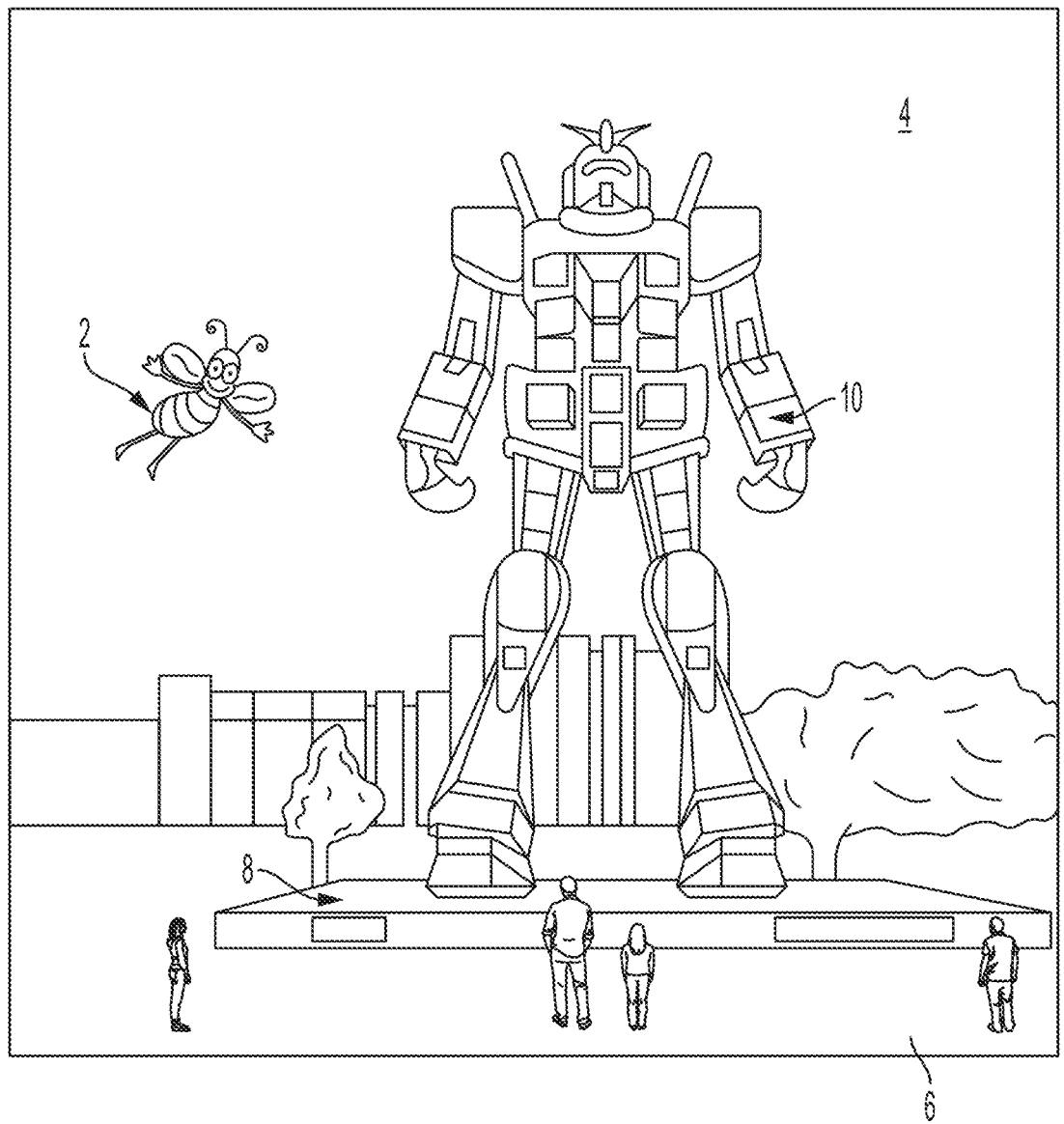

Described herein are methods and apparatus for providing a three-dimensional (3D) representation of an X Reality (XR or cross reality) environment in an XR system. To provide realistic XR experiences to users, an XR system must know the user's physical surroundings in order to correctly correlate a location of virtual objects in relation to real objects.

However, providing a 3D representation of an environment constitutes significant challenges. Substantial processing may be required to compute the 3D representation. The XR system must know how to correctly position virtual objects in relation to a user's head, body, etc. and to render those virtual objects so that they appear to interact realistically with physical objects. Virtual objects, for example, may be occluded by physical objects between the user and the location where the virtual object is to appear. As the user's position in relation to the environment changes, the relevant portions of the environment can also change, which can require further processing. Moreover, the 3D representation is often required to be updated as objects move in the environment (e.g., removing a cushion from a sofa). Updating the 3D representation of the environment that the user is experiencing must be performed quickly without using so much of the computational resources of the XR system generating the XR environment because the computational resources of the XR system in use for updating the 3D representation of the environment is unable to perform other functions.

The inventors have recognized and appreciated techniques to accelerate the creation and updating of a 3D representation of an XR environment with low usage of computational resources by using information captured by a sensor. Depths, representing distances from a sensor to objects in the environment, may be measured by the sensor.

Using the measured depths, the XR system may maintain a map of objects in the environment. That map may be updated relatively frequently, as a depth sensor may output measurements at a rate of tens of times a second. Further, relatively little processing may be required to identify objects from depths, a map made with depths may be updated frequently with low computational burden to identify new objects in the vicinity of the user or, conversely, to identify that objects previously in the vicinity of the user have moved.

The inventors have recognized, however, that depths may provide incomplete or ambiguous information about whether the map of objects in the vicinity of the user should be modified. An object, previously detected from depths, may not be detected for various reasons, for example, the surface being gone, the surface being observed under a different angle and/or a different lighting condition, an interposed object not being picked up by the sensor, and/or the surface being out of range of the sensor.

In some embodiments, a more accurate map of objects may be maintained by selectively removing from the map objects that are not detected in current depths. Objects may be removed, for example, based on detecting in the depths a surface further from the user than the prior location of the object, along a line of sight through the prior location of the object.

In some embodiments, the depths may be associated with different confidence levels based on the sensor-captured information, for example, an amplitude of light reflected by a surface. A smaller amplitude may indicate a lower confidence level on an associated depth while a larger amplitude may indicate a higher confidence level. Various reasons may result in a sensor measurement being assigned with a low confidence level. For example, the closest surface to a sensor may be out of an operating range of the sensor such that accurate information about a surface in the environment is not collected. Alternatively or additionally, the surface may have poor reflection characteristics such that the depth sensor does not detect much radiation from the surface and all measurements are made with a relatively low signal to noise ratio. Alternatively or additionally, the surface may be obscured by another surface such that the sensor acquires no information about the surface.

In some embodiments, the confidence levels of the depths in a depth image may be used to selectively update a map of an object. For example, if one or more depth pixels have values indicating that a surface was detected by the depth sensor behind a location where the object map indicates that an object is present, with high confidence, the object map may be updated to indicate that the object is no longer present in that location. The object map may then be updated to indicate that the object has been removed from the environment or moved to a different location.

In some embodiments, the confidence thresholds for identifying an object in a new location may be different than the threshold for removing an object from a previously detected location. The threshold for removing an object may be lower than for adding an object. For example, a low confidence measurement may provide sufficiently noisy information about the location of a surface that a surface added based on those measurements would have such an imprecise location that it might introduce more errors than not adding the surface. However, a noisy surface may be adequate to remove an object from a map of the environment if the surface, regardless of where it is within a range of confidence levels, is behind the location of the object. Similarly, some depth sensors operate on physical principles that can yield ambiguous depth measurements for depths beyond an operating range. When using depths from those sensors, measurements beyond the operating range of the sensor may be discarded as invalid. Yet, when all ambiguous locations of a surface correspond to locations behind the location of an object in the map, those measurements, which would be treated as invalid for other reasons, may nonetheless be used to determine that the object should be removed from the map.

In some embodiments, a 3D reconstruction may be in a format that facilitates selectively updating the map of objects. The 3D reconstruction may have a plurality of voxels, each representing a volume of an environment represented by the 3D reconstruction. Each voxel may be assigned a value of a signed distance function, indicating the distance, in its respective angle, from the voxel to a detected surface. In embodiments in which the signed distance function is a truncated signed distance function, the maximum absolute value for a distance in a voxel may be truncated to some maximum, T, such that the signed distance would lie in the interval from −T to T. Further, each voxel may include a weight, indicating a certainty that the distance for the voxel accurately reflects the distance to a surface.

In some embodiments, an object may be added or removed from the object map that is part of a 3D representation of an environment based on voxels with weights higher than a threshold. For example, if there is a high certainty, above some threshold, that a surface, recognized as part of an object, is in a particular location, the map may be updated to show that an object is now in that location or that an object has moved into that location. Conversely, if there is a high certainty that a surface has been detected behind the location indicated in the map to contain an object, the map may be updated to indicate that the object is removed or moved to another location.

In some embodiments, objects may be added or removed from a map based on a sequence of depth measurements. The weight stored in each voxel may be updated over time. As a surface is repeatedly detected in a location, the weights stored in voxels having values defined relative to that surface may be increased. Conversely, the weights of voxels indicating that a previously detected surface is still present may be reduced based on a new measurements indicating that the surface is no longer present in that location or a discrepancy in the measurements such that the presence of a surface cannot be confirmed.

Techniques as described herein may be used together or separately with many types of devices and for many types of scenes, including wearable or portable devices with limited computational resources that provide a cross reality scene. In some embodiments, the techniques may be implemented by a service that forms a portion of an XR system.

Figure 2:
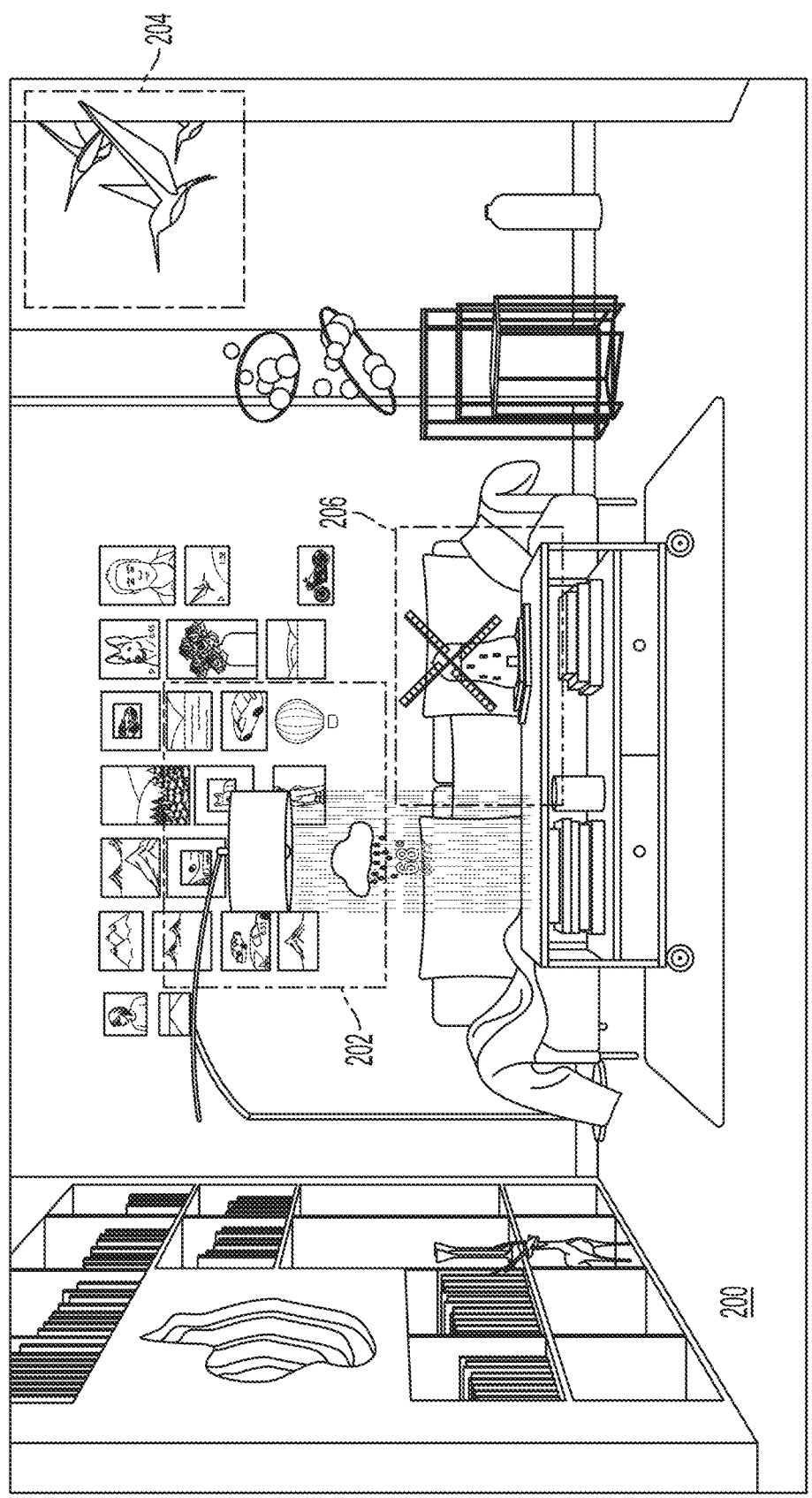
FIG. 2 is a sketch of an exemplary simplified AR scene, showing exemplary 3D reconstruction use cases including visual occlusion, physics-based interactions, and environment reasoning, according to some embodiments.

FIGS. 1-2 illustrate such scenes. For purposes of illustration, an AR system is used as an example of an XR system. FIGS. 3-8 illustrate an exemplary AR system, including one or more processors, memory, sensors and user interfaces that may operate according to the techniques described herein.

Referring to Figure (FIG. 1, an outdoor AR scene 4 is depicted wherein a user of an AR technology sees a physical world park-like setting 6, featuring people, trees, buildings in the background, and a concrete platform 8. In addition to these items, the user of the AR technology also perceives that they "see" a robot statue 10 standing upon the physical world concrete platform 8, and a cartoon-like avatar character 2 flying by which seems to be a personification of a bumble bee, even though these elements (e.g., the avatar character 2, and the robot statue 10) do not exist in the physical world. Due to the extreme complexity of the human visual perception and nervous system, it is challenging to produce an AR technology that facilitates a comfortable, natural-feeling, rich presentation of virtual image elements amongst other virtual or physical world imagery elements.

Such an AR scene may be achieved with a system that includes a 3D reconstruction component, which may build and update a representation of the physical world surfaces around the user. This representation may be used to occlude rendering, to place virtual objects, in physics based interactions, and for virtual character path planning and navigation, or for other operations in which information about the physical world is used. FIG. 2 depicts another example of an indoor AR scene 200, showing exemplary 3D reconstruction use cases, including visual occlusion 202, physics-based interactions 204, and environment reasoning 206, according to some embodiments.

The exemplary scene 200 is a living room having walls, a book shelf on one side of a wall, a floor lamp at a corner of the room, a floor, a sofa and coffee table on the floor. In addition to these physical items, the user of the AR technology also perceives virtual objects such as images on the wall behind the sofa, birds flying through the door, a deer peeking out from the book shelf, and a decoration in the form of a windmill placed on the coffee table. For the images on the wall, the AR technology requires information about not only surfaces of the wall but also objects and surfaces in the room such as lamp shape, which are occluding the images to render the virtual objects correctly. For the flying birds flying, the AR technology requires information about all the objects and surfaces around the room for rendering the birds with realistic physics to avoid the objects and surfaces or bounce off them if the birds collide. For the deer, the AR technology requires information about the surfaces such as the floor or coffee table to compute where to place the deer. For the windmill, the system may identify that is an object separate from the table and may reason that it is movable, whereas corners of shelves or corners of the wall may be reasoned to be stationary. Such a distinction may be used in reasoning as to which portions of the scene are used or updated in each of various operations.

A scene may be presented to the user via a system that includes multiple components, including a user interface that can stimulate one or more user senses, including sight sound and/or touch. In addition, the system may include one or more sensors that may measure parameters of the physical portions of the scene, including position and/or motion of the user within the physical portions of the scene. Further, the system may include one or more computing devices, with associated computer hardware, such as memory. These components may be integrated into a single device or more be distributed across multiple interconnected devices. In some embodiments some or all of these components may be integrated into a wearable device.

Figure 3:
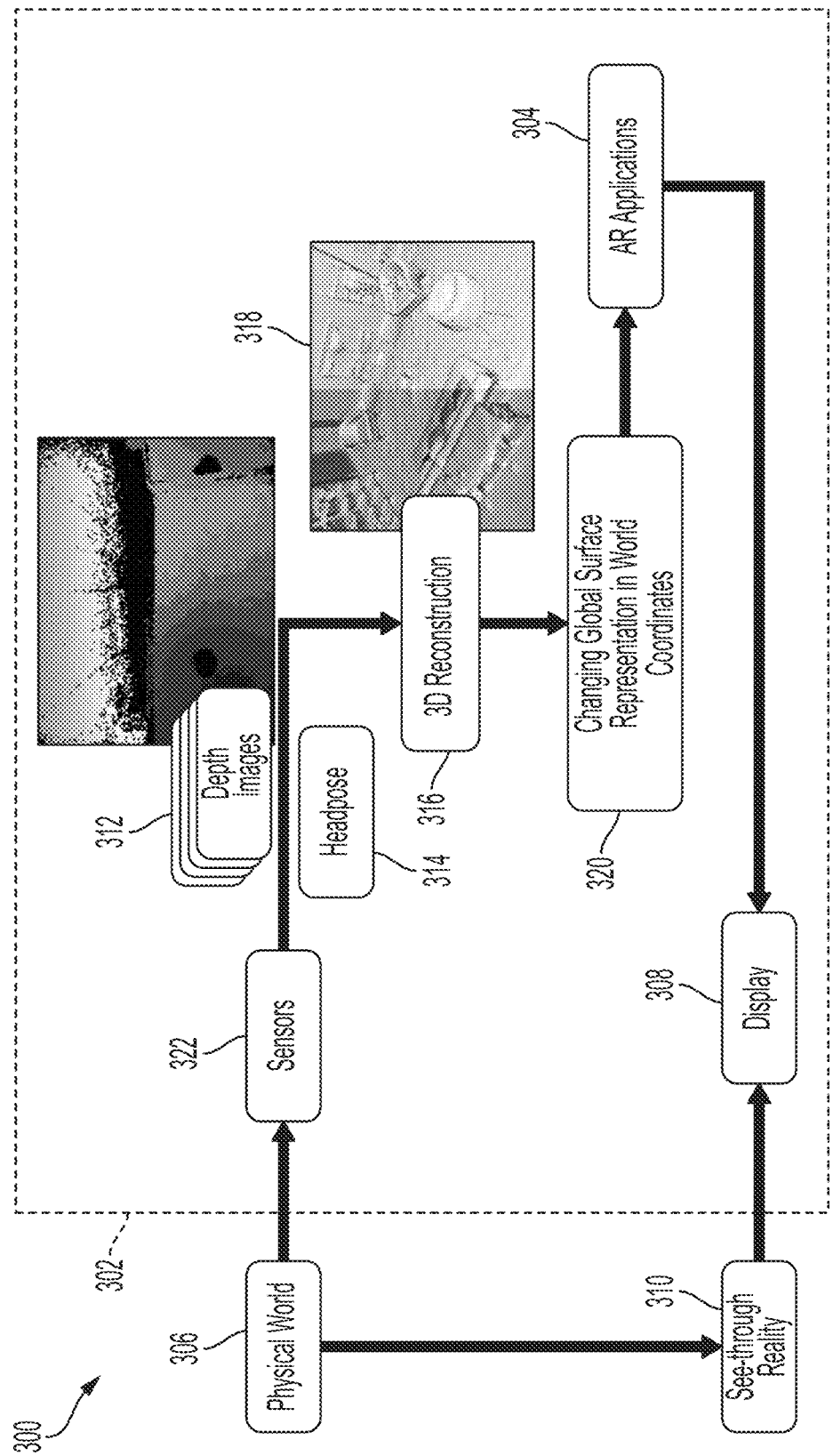
FIG. 3 is a schematic diagram illustrating data flow in an AR system configured to provide an experience of AR content interacting with a physical world, according to some embodiments.

FIG. 3 depicts an AR system 302 configured to provide an experience of AR content interacting with a physical world 306, according to some embodiments. The AR system 302 may include a display 308. In the illustrated embodiment, the display 308 may be worn by the user as part of a headset such that a user may wear the display over their eyes like a pair of goggles or glasses. At least a portion of the display may be transparent such that a user may observe a see-through reality 310. The see-through reality 310 may correspond to portions of the physical world 306 that are within a present viewpoint of the AR system 302, which may correspond to the viewpoint of the user in the case that the user is wearing a headset incorporating both the display and sensors of the AR system to acquire information about the physical world.

AR content may also be presented on the display 308, overlaid on the see-through reality 310. To provide accurate interactions between AR content and the see-through reality 310 on the display 308, the AR system 302 may include sensors 322 configured to capture information about the physical world 306.

The sensors 322 may include one or more depth sensors that output depth images 312. Each depth image 312 may have multiple pixels, each of which may represent a distance to a surface in the physical world 306 in a particular direction relative to the depth sensor. Raw depth data may come from a depth sensor to create a depth image. Such depth images may be updated as fast as the depth sensor can form a new image, which may be hundreds or thousands of times per second. However, that data may be noisy and incomplete, and have holes shown as black pixels on the illustrated depth image. In some embodiments, holes may be pixels to which no value is assigned or that have such a low confidence that any value is below a threshold and disregarded.

The system may include other sensors, such as image sensors. The image sensors may acquire information that may be processed to represent the physical world in other ways. For example, the images may be processed in 3D reconstruction component 316 to create a mesh, representing connected portions of objects in the physical world. Metadata about such objects, including for example, color and surface texture, may similarly be acquired with the sensors and stored as part of the 3D reconstruction.

The system may also acquire information about the headpose of the user with respect to the physical world. In some embodiments, sensors 310 may include inertial measurement units that may be used to compute and/or determine a headpose 314. A headpose 314 for a depth image may indicate a present viewpoint of a sensor capturing the depth image with six degrees of freedom (6DoF), for example, but the headpose 314 may be used for other purposes, such as to relate image information to a particular portion of the physical world or to relate the position of the display worn on the user's head to the physical world. In some embodiments, the headpose information may be derived in other ways than from an IMU, such as from analyzing objects in an image.

The 3D reconstruction component 316 may receive the depth images 312 and headposes 314, and any other data from the sensors, and integrate that data into a reconstruction 318, which may at least appears to be a single, combined reconstruction. The reconstruction 318 may be more complete and less noisy than the sensor data. The 3D reconstruction component 316 may update the reconstruction 318 using spatial and temporal averaging of the sensor data from multiple viewpoints over time.

The reconstruction 318 may include representations of the physical world in one or more data formats including, for example, voxels, meshes, planes, etc. The different formats may represent alternative representations of the same portions of the physical world or may represent different portions of the physical world. In the illustrated example, on the left side of the reconstruction 318, portions of the physical world are presented as a global surface; on the right side of the reconstruction 318, portions of the physical world are presented as meshes.

The reconstruction 318 may be used for AR functions, such as producing a surface representation of the physical world for occlusion processing or physics-based processing. This surface representation may change as the user moves or objects in the physical world change. Aspects of the reconstruction 318 may be used, for example, by a component 320 that produces a changing global surface representation in world coordinates, which may be used by other components.

The AR content may be generated based on this information, such as by AR applications 304. An AR application 304 may be a game program, for example, that performs one or more functions based on information about the physical world, such visual occlusion, physics-based interactions, and environment reasoning. It may perform these functions by querying data in different formats from the reconstruction 318 produced by the 3D reconstruction component 316. In some embodiments, component 320 may be configured to output updates when a representation in a region of interest of the physical world changes. That region of interest, for example, may be set to approximate a portion of the physical world in the vicinity of the user of the system, such as the portion within the view field of the user, or is projected (predicted/determined) to come within the view field of the user.

The AR applications 304 may use this information to generate and update the AR content. The virtual portion of the AR content may be presented on the display 308 in combination with the see-through reality 310, creating a realistic user experience.

Figure 4:
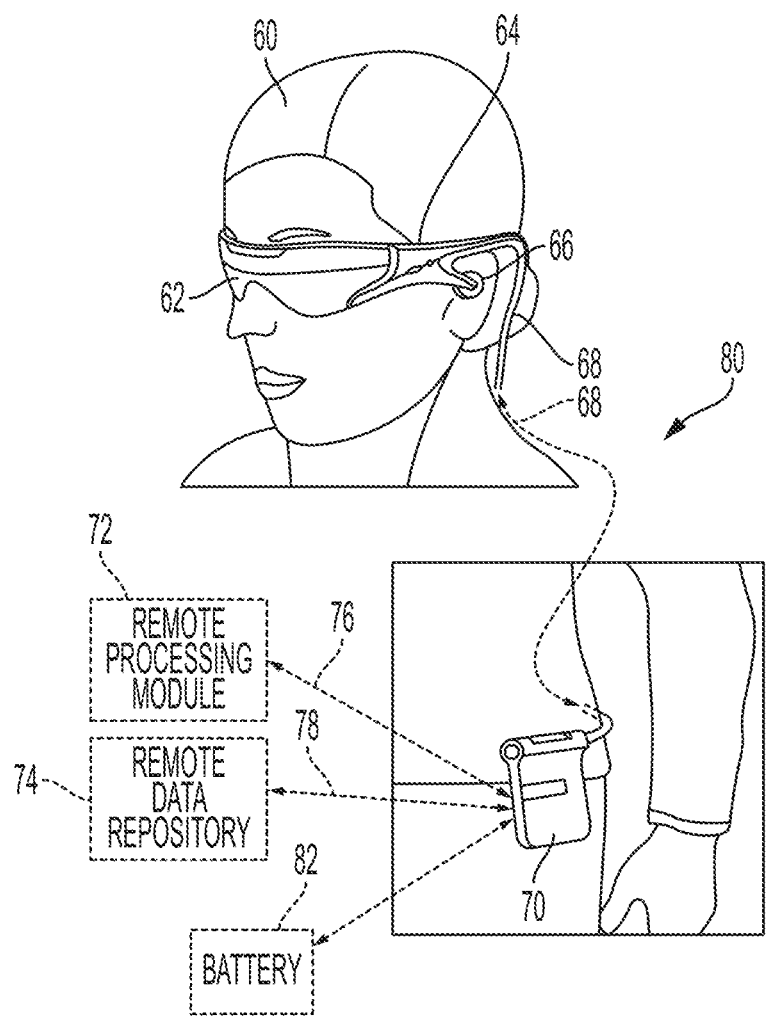
FIG. 4 is a schematic diagram illustrating an example of an AR display system, according to some embodiments.

In some embodiments, an AR experience may be provided to a user through a wearable display system. FIG. 4 illustrates an example of wearable display system 80 (hereinafter referred to as "system 80"). The system 80 includes a head mounted display device 62 (hereinafter referred to as "display device 62"), and various mechanical and electronic modules and systems to support the functioning of the display device 62. The display device 62 may be coupled to a frame 64, which is wearable by a display system user or viewer 60 (hereinafter referred to as "user 60") and configured to position the display device 62 in front of the eyes of the user 60. According to various embodiments, the display device 62 may be a sequential display. The display device 62 may be monocular or binocular. In some embodiments, the display device 62 may be an example of the display 308 in FIG. 3.

In some embodiments, a speaker 66 is coupled to the frame 64 and positioned proximate an ear canal of the user 60. In some embodiments, another speaker, not shown, is positioned adjacent another ear canal of the user 60 to provide for stereo/shapeable sound control. The display device 62 is operatively coupled, such as by a wired lead or wireless connectivity 68, to a local data processing module 70 which may be mounted in a variety of configurations, such as fixedly attached to the frame 64, fixedly attached to a helmet or hat worn by the user 60, embedded in headphones, or otherwise removably attached to the user 60 (e.g., in a backpack-style configuration, in a belt-coupling style configuration).

The local data processing module 70 may include a processor, as well as digital memory, such as non-volatile memory (e.g., flash memory), both of which may be utilized to assist in the processing, caching, and storage of data. The data include data a) captured from sensors (which may be, e.g., operatively coupled to the frame 64) or otherwise attached to the user 60, such as image capture devices (such as cameras), microphones, inertial measurement units, accelerometers, compasses, GPS units, radio devices, and/or gyros; and/or b) acquired and/or processed using remote processing module 72 and/or remote data repository 74, possibly for passage to the display device 62 after such processing or retrieval. The local data processing module 70 may be operatively coupled by communication links 76, 78, such as via a wired or wireless communication links, to the remote processing module 72 and remote data repository 74, respectively, such that these remote modules 72, 74 are operatively coupled to each other and available as resources to the local processing and data module 70. In some embodiments, the 3D reconstruction component 316 in FIG. 3 may be at least partially implemented in the local data processing module 70. For example, the local data processing module 70 may be configured to execute computer executable instructions to generate the physical world representations based at least in part on at least a portion of the data.

In some embodiments, the local data processing module 70 may include one or more processors (e.g., a graphics processing unit (GPU)) configured to analyze and process data and/or image information. In some embodiments, the local data processing module 70 may include a single processor (e.g., a single-core or multi-core ARM processor), which would limit the module 70's compute budget but enable a more miniature device. In some embodiments, the 3D reconstruction component 316 may use a compute budget less than a single ARM core to generate physical world representations in real-time on a non-predefined space such that the remaining compute budget of the single ARM core can be accessed for other uses such as, for example, extracting meshes.

In some embodiments, the remote data repository 74 may include a digital data storage facility, which may be available through the Internet or other networking configuration in a "cloud" resource configuration. In some embodiments, all data is stored and all computations are performed in the local data processing module 70, allowing fully autonomous use from a remote module. A 3D reconstruction, for example, may be stored in whole or in part in this repository 74.

In some embodiments, the local data processing module 70 is operatively coupled to a battery 82. In some embodiments, the battery 82 is a removable power source, such as over the counter batteries. In other embodiments, the battery 82 is a lithium-ion battery. In some embodiments, the battery 82 includes both an internal lithium-ion battery chargeable by the user 60 during non-operation times of the system 80 and removable batteries such that the user 60 may operate the system 80 for longer periods of time without having to be tethered to a power source to charge the lithium-ion battery or having to shut the system 80 off to replace batteries.

Figure 5A:
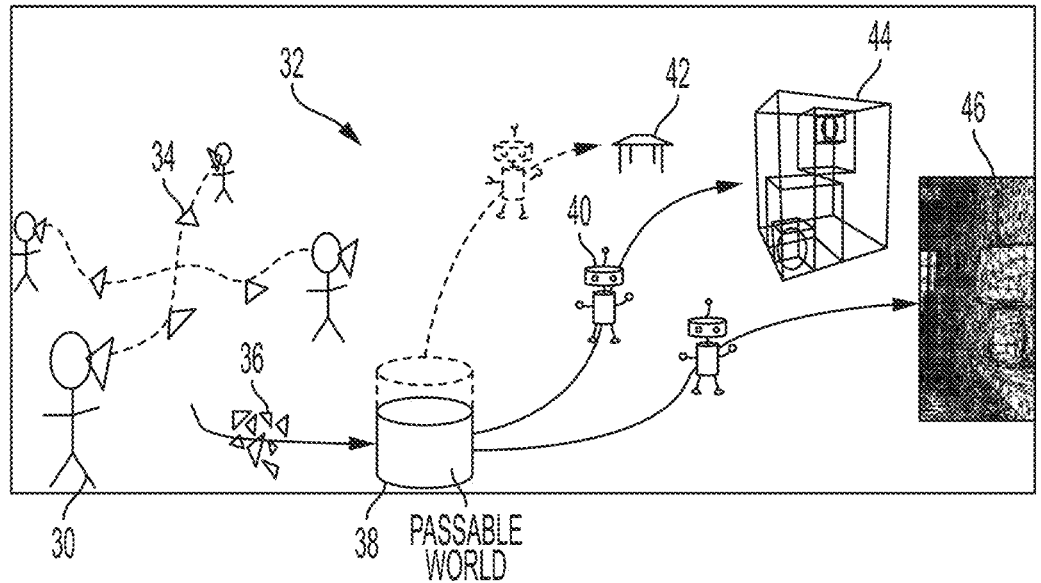
FIG. 5A is a schematic diagram illustrating a user wearing an AR display system rendering AR content as the user moves through a physical world environment, according to some embodiments.

FIG. 5A illustrates a user 30 wearing an AR display system rendering AR content as the user 30 moves through a physical world environment 32 (hereinafter referred to as "environment 32"). The user 30 positions the AR display system at positions 34, and the AR display system records ambient information of a passable world (e.g., a digital representation of the real objects in the physical world that can be stored and updated with changes to the real objects in the physical world) relative to the positions 34 such as pose relation to mapped features or directional audio inputs. The positions 34 are aggregated to data inputs 36 and processed at least by a passable world module 38, which may be implemented, for example, by processing on a remote processing module 72 of FIG. 4. In some embodiments, the passable world module 38 may include the 3D reconstruction component 316.

The passable world module 38 determines where and how AR content 40 can be placed in the physical world as determined from the data inputs 36. The AR content is "placed" in the physical world by presenting via the user interface both a representation of the physical world and the AR content, with the AR content rendered as if it were interacting with objects in the physical world and the objects in the physical world presented as if the AR content were, when appropriate, obscuring the user's view of those objects. In some embodiments, the AR content may be placed by appropriately selecting portions of a fixed element 42 (e.g., a table) from a reconstruction (e.g., the reconstruction 318) to determine the shape and position of the AR content 40. As an example, the fixed element may be a table and the virtual content may be positioned such that it appears to be on that table. In some embodiments, the AR content may be placed within structures in a field of view 44, which may be a present field of view or an estimated future field of view. In some embodiments, the AR content may be placed relative to a mapped mesh model 46 of the physical world.

As depicted, the fixed element 42 serves as a proxy for any fixed element within the physical world which may be stored in the passable world module 38 so that the user 30 can perceive content on the fixed element 42 without the system having to map to the fixed element 42 each time the user 30 sees it. The fixed element 42 may, therefore, be a mapped mesh model from a previous modeling session or determined from a separate user but nonetheless stored on the passable world module 38 for future reference by a plurality of users. Therefore, the passable world module 38 may recognize the environment 32 from a previously mapped environment and display AR content without a device of the user 30 mapping the environment 32 first, saving computation process and cycles and avoiding latency of any rendered AR content.

The mapped mesh model 46 of the physical world may be created by the AR display system and appropriate surfaces and metrics for interacting and displaying the AR content 40 can be mapped and stored in the passable world module 38 for future retrieval by the user 30 or other users without the need to re-map or model. In some embodiments, the data inputs 36 are inputs such as geolocation, user identification, and current activity to indicate to the passable world module 38 which fixed element 42 of one or more fixed elements are available, which AR content 40 has last been placed on the fixed element 42, and whether to display that same content (such AR content being "persistent" content regardless of user viewing a particular passable world model).

Even in embodiments in which objects are considered to be fixed, the passable world module 38 may be updated from time to time to account for the possibility of changes in the physical world. The model of fixed objects may be updated with a very low frequency. Other objects in the physical world may be moving or otherwise not regarded as fixed. To render an AR scene with a realistic feel, the AR system may update the position of these non-fixed objects with a much higher frequency than is used to update fixed objects. To enable accurate tracking of all of the objects in the physical world, an AR system may draw information from multiple sensors, including one or more image sensors.

Figure 5B:
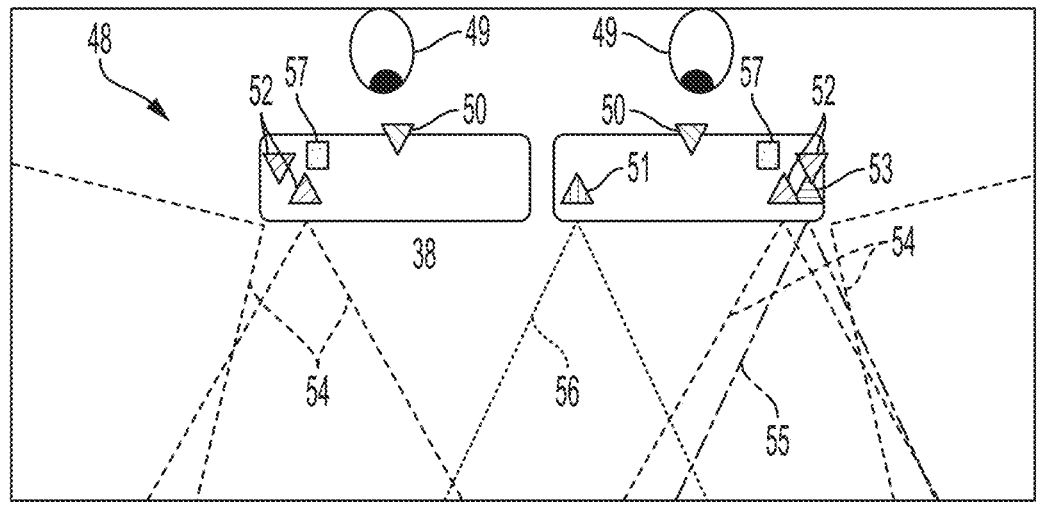
FIG. 5B is a schematic diagram illustrating a viewing optics assembly and attendant components, according to some embodiments.

FIG. 5B is a schematic illustration of a viewing optics assembly 48 and attendant components. In some embodiments, two eye tracking cameras 50, directed toward user eyes 49, detect metrics of the user eyes 49, such as eye shape, eyelid occlusion, pupil direction and glint on the user eyes 49. In some embodiments, one of the sensors may be a depth sensor 51, such as a time of flight sensor, emitting signals to the world and detecting reflections of those signals from nearby objects to determine distance to given objects. A depth sensor, for example, may quickly determine whether objects have entered the field of view of the user, either as a result of motion of those objects or a change of pose of the user. However, information about the position of objects in the field of view of the user may alternatively or additionally be collected with other sensors. Depth information, for example, may be obtained from stereoscopic visual image sensors or plenoptic sensors.

In some embodiments, world cameras 52 record a greater-than-peripheral view to map the environment 32 and detect inputs that may affect AR content. In some embodiments, the world camera 52 and/or camera 53 may be grayscale and/or color image sensors, which may output grayscale and/or color image frames at fixed time intervals. Camera 53 may further capture physical world images within a field of view of the user at a specific time. Pixels of a frame-based image sensor may be sampled repetitively even if their values are unchanged. Each of the world cameras 52, the camera 53 and the depth sensor 51 have respective fields of view of 54, 55, and 56 to collect data from and record a physical world scene, such as the physical world environment 32 depicted in FIG. 5A.

Inertial measurement units 57 may determine movement and orientation of the viewing optics assembly 48. In some embodiments, each component is operatively coupled to at least one other component. For example, the depth sensor 51 is operatively coupled to the eye tracking cameras 50 as a confirmation of measured accommodation against actual distance the user eyes 49 are looking at.

It should be appreciated that a viewing optics assembly 48 may include some of the components illustrated in FIG. 5B and may include components instead of or in addition to the components illustrated. In some embodiments, for example, a viewing optics assembly 48 may include two world camera 52 instead of four. Alternatively or additionally, cameras 52 and 53 need not capture a visible light image of their full field of view. A viewing optics assembly 48 may include other types of components. In some embodiments, a viewing optics assembly 48 may include one or more dynamic vision sensor (DVS), whose pixels may respond asynchronously to relative changes in light intensity exceeding a threshold.

In some embodiments, a viewing optics assembly 48 may not include the depth sensor 51 based on time of flight information. In some embodiments, for example, a viewing optics assembly 48 may include one or more plenoptic cameras, whose pixels may capture light intensity and an angle of the incoming light, from which depth information can be determined. For example, a plenoptic camera may include an image sensor overlaid with a transmissive diffraction mask (TDM). Alternatively or additionally, a plenoptic camera may include an image sensor containing angle-sensitive pixels and/or phase-detection auto-focus pixels (PDAF) and/or micro-lens array (MLA). Such a sensor may serve as a source of depth information instead of or in addition to depth sensor 51.

It also should be appreciated that the configuration of the components in FIG. 5B is illustrated as an example. A viewing optics assembly 48 may include components with any suitable configuration, which may be set to provide the user with the largest field of view practical for a particular set of components. For example, if a viewing optics assembly 48 has one world camera 52, the world camera may be placed in a center region of the viewing optics assembly instead of at a side.

Information from the sensors in viewing optics assembly 48 may be coupled to one or more of processors in the system. The processors may generate data that may be rendered so as to cause the user to perceive virtual content interacting with objects in the physical world. That rendering may be implemented in any suitable way, including generating image data that depicts both physical and virtual objects. In other embodiments, physical and virtual content may be depicted in one scene by modulating the opacity of a display device that a user looks through at the physical world. The opacity may be controlled so as to create the appearance of the virtual object and also to block the user from seeing objects in the physical world that are occluded by the virtual objects. In some embodiments, the image data may only include virtual content that may be modified such that the virtual content is perceived by a user as realistically interacting with the physical world (e.g. clip content to account for occlusions), when viewed through the user interface. Regardless of how content is presented to a user, a model of the physical world is required so that characteristics of the virtual objects, which can be impacted by physical objects, including the shape, position, motion and visibility of the virtual object, can be correctly computed. In some embodiments, the model may include the reconstruction of a physical world, for example, the reconstruction 318.

That model may be created from data collected from sensors on a wearable device of the user. Though, in some embodiments, the model may be created from data collected by multiple users, which may be aggregated in a computing device remote from all of the users (and which may be "in the cloud").

Figure 6:
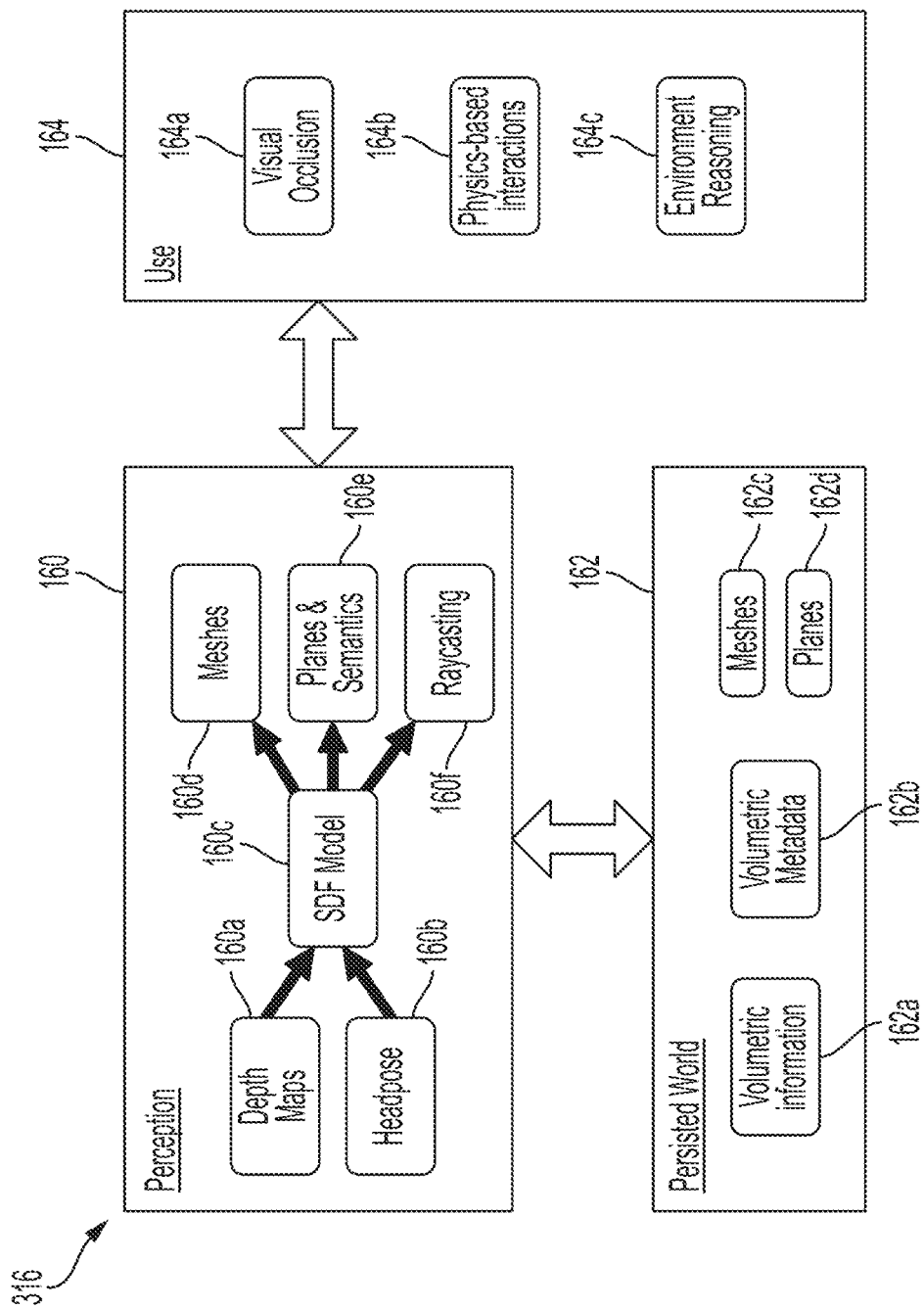
FIG. 6 is a schematic diagram illustrating an AR system using a 3D reconstruction system, according to some embodiments.

The model may be created, at least in part, by a 3D reconstruction system, for example, the 3D reconstruction component 316 of FIG. 3 depicted in more detail in FIG. 6. The 3D reconstruction component 316 may include a perception module 160 that may generate, update, and store representations for a portion of the physical world. In some embodiments, the perception module 160 may represent the portion of the physical world within a reconstruction range of the sensors as multiple voxels. Each voxel may correspond to a 3D cube of a predetermined volume in the physical world, and include surface information, indicating whether there is a surface in the volume represented by the voxel. Voxels may be assigned values indicating whether their corresponding volumes have been determined to include surfaces of physical objects, determined to be empty or have not yet been measured with a sensor and so their value is unknown. It should be appreciated that values indicating that voxels that are determined to be empty or unknown need not be explicitly stored, as the values of voxels may be stored in computer memory in any suitable way, including storing no information for voxels that are determined to be empty or unknown. In some embodiments, a portion of a computer memory of an XR system may be mapped to represent a grid of voxels and store the values of respective voxels.

Figure 7C:
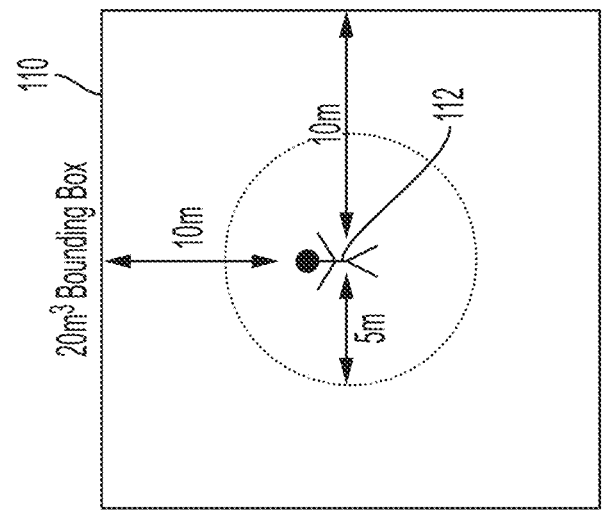
FIG. 7C is a schematic diagram illustrating a perception range with respect to a reconstruction range at a single position, according to some embodiments.
Figure 7B:
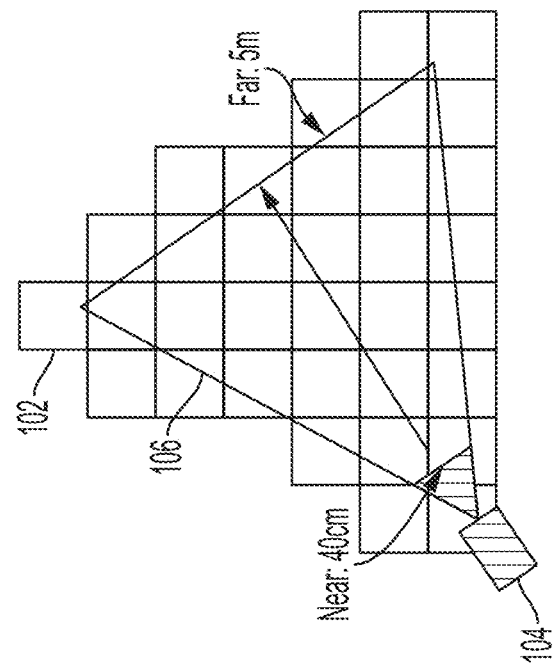
FIG. 7B is a schematic diagram illustrating a reconstruction range with respect to a single viewpoint, according to some embodiments.
Figure 7A:
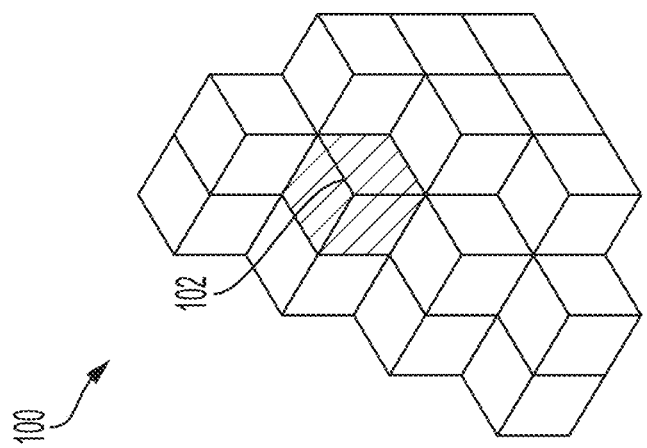
FIG. 7A is a schematic diagram illustrating a 3D space discretized into voxels, according to some embodiments.

FIG. 7A depicts an example of a 3D space 100 discretized into voxels 102. In some embodiments, the perception module 160 may determine objects of interest and set the volume of a voxel in order to capture features of the objects of interest and avoid redundant information. For example, the perception module 160 may be configured to identify larger objects and surfaces, such as walls, ceilings, floors, and large furniture. Accordingly, a volume of a voxel may be set to a relatively large size, for example, a cube of 4 cm$^3$.

Figure 8A:
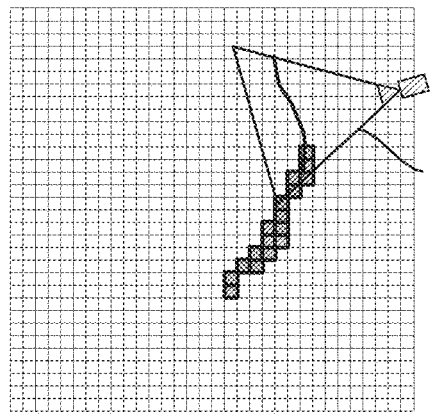
FIGS. 8A-F are schematic diagrams illustrating reconstructing a surface in a physical world into a voxel model by an image sensor viewing the surface from multiple positions and viewpoints, according to some embodiments.

A reconstruction of a physical world including voxels may be referred to as a volumetric model. Information to create a volumetric model may be created over time as the sensors move about the physical world. Such motion may happen as the user of a wearable device including the sensors moves around. FIGS. 8A-F depict an example of reconstructing a physical world into a volumetric model. In the illustrated example, the physical world includes a portion 180 of a surface which is shown in FIG. 8A. In FIG. 8A, a sensor 182 at a first location may have a field of view 184, within which the portion 180 of the surface is visible.

Figure 8B:
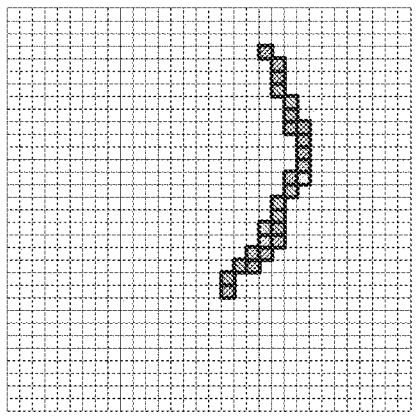

The sensor 182 may be of any suitable type, such as a depth sensor. However, depth data may be derived from an image sensor(s) or in other ways. The perception module 160 may receive data from the sensor 182, and then set the values of multiple voxels 186 as illustrated in FIG. 8B to represent the portion 180 of the surface visible by the sensor 182 in the field of view 184.

Figure 8C:
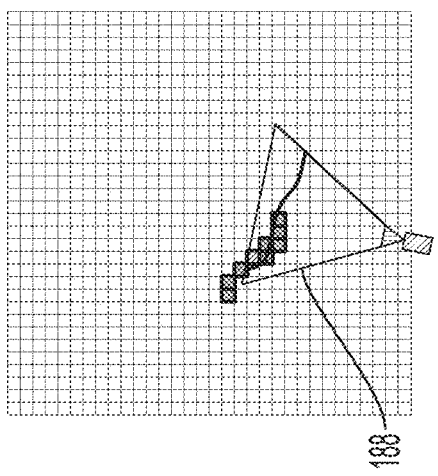
Figure 8D:
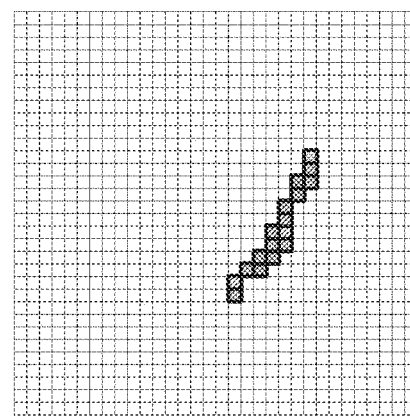

In FIG. 8C, the sensor 182 may move to a second location and have a field of view 188. As shown in FIG. 8D, a further group of voxels become visible, and the values of these voxels may be set to indicate the location of the portion of the surface that has entered the field of view 188 of sensor 182. The values of these voxels may be added to the volumetric model for the surface.

Figure 8E:
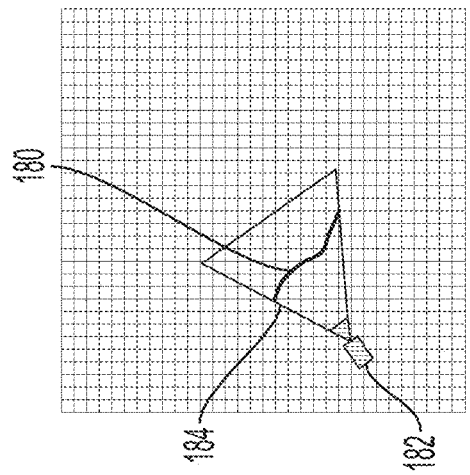
Figure 8F:
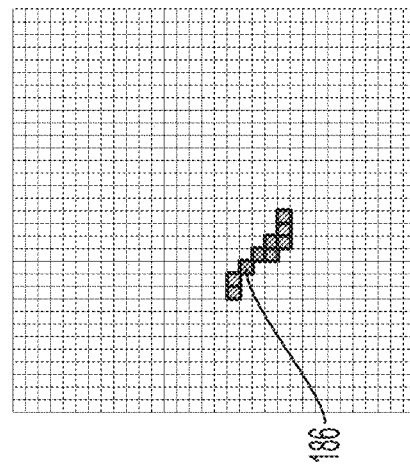

In FIG. 8E, the sensor 182 may further move to a third location and have a field of view 190. In the illustrated example, additional portions of the surface becomes visible in the field of view 190. As shown in FIG. 8F, a further group of voxels may become visible, and the values of these voxels may be set to indicate the location of the portion of the surface that has entered the field of view 190 of the sensor 182. The values of these voxels may be added to the volumetric model for the surface. As shown in FIG. 6, this information may be stored as part of the persisted world as volumetric information 162*a*. Information about the surfaces may also be stored, such as color or texture. Such information may be stored, for example, as volumetric metadata 162*b*.

In addition to generating information for a persisted world representation, the perception module 160 may identify and output indications of changes in a region around a user of a AR system. Indications of such changes may trigger updates to volumetric data stored as part of the persisted world, or trigger other functions, such as triggering components 304 that generate AR content to update the AR content.

In some embodiments, the perception module 160 may identify changes based on a signed distance function (SDF) model. The perception module 160 may be configured to receive sensor data such as, for example, depth images 160*a* and headposes 160*b*, and then fuse the sensor data into a SDF model 160*c*. Depth images 160*a* may provide SDF information directly, and images may be processed to arrive at SDF information. The SDF information represents distance from the sensors used to capture that information. As those sensors may be part of a wearable unit, the SDF information may represent the physical world from the perspective of wearable unit and therefore the perspective of the user. The headposes 160*b* may enable the SDF information to be related to a voxel in the physical world.

Referring back to FIG. 6, in some embodiments, the perception module 160 may generate, update, and store representations for the portion of the physical world that is within a perception range. The perception range may be determined based, at least in part, on a sensor's reconstruction range, which may be determined based, at least in part, on the limits of a sensor's observation range. As a specific example, an active depth sensor that operates using active IR pulses may be operate reliably over a range of distances, creating the observation range of the sensor, which may be from a few centimeters or tens of centimeters to a few meters.

FIG. 7B depicts a reconstruction range with respect to a sensor 104 having a viewpoint 106. A reconstruction of 3D spaces within the viewpoint 106 may be built based on data captured by the sensor 104. In the illustrated example, the sensor 104 has an observation range of 40 cm to 5 m. In some embodiments, a sensor's reconstruction range may be determined to be smaller than the observation range of the sensor because sensor outputs close to its observation limits may be more noisy, incomplete, and inaccurate. For example, in the illustrated example of 40 cm to 5 m, a corresponding reconstruction range may be set to be from 1 to 3 m, and data collected with the sensor indicating surfaces outside this range may not be used.

In some embodiments, the perception range may be larger than a sensor's reconstruction range. If components 164 that use data about the physical world require data about regions within the perception range that are outside the portions of the physical world that are within the current reconstruction range, that information may be provided from the persisted world 162. Accordingly, information about the physical world may be readily accessible by a query. In some embodiments, an API may be provided to respond to such a query, providing information about the current perception range of the user. Such technique may reduce time needed to access an existing reconstruction and provide an improved user experience.

In some embodiments, the perception range may be a 3D space corresponding to a bounding box centered around a user location. As the user moves, the portion of the physical world within the perception range, which may be queryable by the components 164, may move with the user. FIG. 7C depicts a bounding box 110 centered around a location 112. It should be appreciated that the size of the bounding box 110 may be set to enclose a sensor's observation range with reasonable extensions because a user cannot move at an unreasonable speed. In the illustrated example, a sensor worn by the user has an observation limit of 5 m. The bounding box 110 is set as a cube of 20 m$^3$.

Referring back to FIG. 6, the 3D reconstruction component 316 may include additional modules that may interact with the perception module 160. In some embodiments, a persisted world module 162 may receive representations for the physical world based on data acquired by the perception module 160. The persisted world module 162 also may include various formats of representations of the physical world. For example, volumetric metadata 162*b* such as voxels may be stored as well as meshes 162*c* and planes 162*d*. In some embodiments, other information, such as depth images could be saved.

In some embodiments, the perception module 160 may include modules that generate representations for the physical world in various formats including, for example, meshes 160*d*, planes and semantics 160*e*. These modules may generate representations based on data within the perception range of one or more sensors at the time the representation is generated as well as data captured at prior times and information in the persisted world 162. In some embodiments, these components may operate on depth information captured with a depth sensor. However, the AR system may include vision sensors and may generate such representations by analyzing monocular or binocular vision information.

In some embodiments, these modules may operate on regions of the physical world. Those modules may be triggered to update a subregion of the physical world, when the perception module 160 detects a change in the physical world in that subregion. Such a change, for example, may be detected by detecting a new surface in the SDF model 160c or other criteria, such as changing the value of a sufficient number of voxels representing the subregion.

The 3D reconstruction component 316 may include components 164 that may receive representations of the physical world from the perception module 160. Information about the physical world may be pulled by these components according to, for example, a use request from an application. In some embodiments, information may be pushed to the use components, such as via an indication of a change in a pre-identified region or a change of the physical world representation within the perception range. The components 164, may include, for example, game programs and other components that perform processing for visual occlusion, physics-based interactions, and environment reasoning.

Responding to the queries from the components 164, the perception module 160 may send representations for the physical world in one or more formats. For example, when the component 164 indicates that the use is for visual occlusion or physics-based interactions, the perception module 160 may send a representation of surfaces. When the component 164 indicates that the use is for environmental reasoning, the perception module 160 may send meshes, planes and semantics of the physical world.

In some embodiments, the perception module 160 may include components that format information to provide the component 164. An example of such a component may be raycasting component 160f. A use component (e.g., component 164), for example, may query for information about the physical world from a particular point of view. Raycasting component 160f may select from one or more representations of the physical world data within a field of view from that point of view.

As should be appreciated from the foregoing description, the perception module 160, or another component of an AR system, may process data to create 3D representations of portions of the physical world. Data to be processed may be reduced by culling parts of a 3D reconstruction volume based at last in part on a camera frustum and/or depth image, extracting and persisting plane data, capturing, persisting and updating 3D reconstruction data in blocks that allow local update while maintaining neighbor consistency, providing occlusion data to applications generating such scenes, where the occlusion data is derived from a combination of one or more depth data sources, and/or performing a multi-stage mesh simplification.

A 3D reconstruction system may integrate sensor data over time from multiple viewpoints of a physical world. The poses of the sensors (e.g., position and orientation) may be tracked as a device including the sensors is moved. As the sensor's frame pose is known and how it relates to the other poses, each of these multiple viewpoints of the physical world may be fused together into a single, combined reconstruction. The reconstruction may be more complete and less noisy than the original sensor data by using spatial and temporal averaging (i.e. averaging data from multiple viewpoints over time). The reconstruction may contain data of different levels of sophistication including, for example, raw data such as live depth data, fused volumetric data such as voxels, and computed data such as meshes.

FIG. 9A depicts a cross-sectional view of a scene 900 along a plane parallel to y-coordinate and z-coordinate, according to some embodiments. Surfaces in a scene may be represented using truncated signed distance functions (TSDFs), which may map each 3D point in the scene to a distance to its nearest surface. The voxels representing a position on a surface may be assigned a zero depth. A surface in a scene may correspond to a range of uncertainty, such as because an XR system may conduct multiple depth measurements, for example, scanning a surface twice from two different angles or by two different users. Each measurement may result a depth slightly different from the other measured depths.

Based on the range of uncertainty of a measured location of a surface, the XR system may assign weights associated with voxels within that range of uncertainty. In some embodiments, voxels that are greater than some distance, T, from the surface may convey no use, other than that, with a high degree of confidence. Those voxels may correspond to locations in front of or behind a surface. Those voxels might be simply assigned with a magnitude of T to simplify processing. Accordingly, voxels may be assigned values in a truncated band [−T, 7] from an estimated surface, with negative values indicating locations in front of the surface and positive values indicating locations behind the surface. The XR system may compute weights to represent certainty about a computed signed distance to a surface. In the illustrated embodiment, the weights span between "1" and "0," with "1" representing the most certain and "0" the least certain. The weights may be determined based on the technology used to measure the depths because of different accuracies provided by different technologies including, for example, stereoscopic imaging, structured light projection, time-of-flight cameras, sonar imaging, and the like. In some embodiments, voxels corresponding to distances for which no accurate measurement is made may be assigned a weight of zero. In such case, the magnitude of the voxel may be set to any value, such as T.

An XR system may represent the scene 900 by a grid of voxels 902. As described above, each voxel may represent a volume of the scene 900. Each voxel may store a signed distance from the voxel's center point to its nearest surface. A positive sign may indicate behind the surface while a negative sign may indicate before the surface. The signed distance may be computed as a weighted combination of the distances obtained from the multiple measurements. Each voxel may store a weight corresponding to the stored signed distance.

In the illustrated example, the scene 900 includes a surface 904, captured in a depth image (not shown) by a depth sensor 906. The depth image may be stored in computer memory in any convenient way that captures distance between some reference point and surfaces in the scene 900. In some embodiments, the depth image may be represented as values in a plane parallel to an x-coordinate and y-coordinate, as illustrated in FIG. 9A, with the reference point being the origin of the coordinate system. Locations in the X-Y plane may correspond to directions relative to the reference point. Values at those pixel locations may indicate distance from the reference point to the nearest surface in the direction indicated by the coordinate in the plane. Such a depth image may include a grid of pixels (not shown) in the plane parallel to the x-coordinate and y-coordinate. Each pixel may indicate a distance, in a particular direction, from the image sensor 906 to the surface 904.

The XR system may update the grid of voxels based on the depth image captured by the sensor 906. TSDFs stored in the grid of voxels may be computed based on the depth image and the corresponding pose of the depth sensor 906. A voxel in the grid may be updated based on one or more pixels in the depth images depending on, for example, whether a silhouette of the voxel overlaps with the one or more pixels.

Figure 9B:
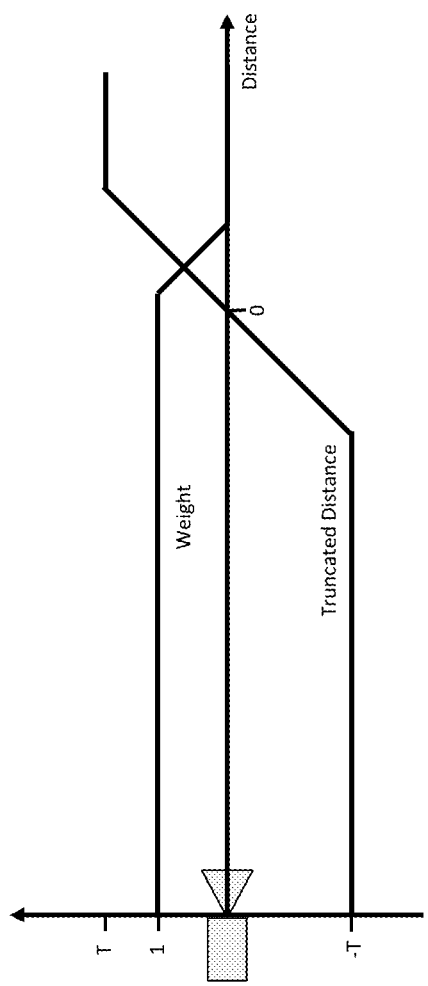
FIG. 9B is a schematic diagram illustrating a truncated signed distance function (TSDF) relating to truncated signed distances and weights assigned to voxels of FIG. 9A based on distance from a surface.

In the illustrated example, voxels before the surface 904 but outside the truncated distance −T are assigned with a signed distance of the truncated distance −T and a weight of "1" because it is certain that everything between the sensor and the surface is empty. Voxels between the truncated distance −T and the surface 904 are assigned with a signed distance between the truncated distance −T and 0, and a weight of "1" because it is certain to be outside an object. Voxels between the surface 904 and a predetermined depth behind the surface 904 are assigned with a signed distance between 0 and the truncated distance T, and a weight between "1" and "0" because the farther away a voxel behind the surface, the less certain is whether it represents inside of an object or empty space. After the predetermined depth, all voxels lying behind the surface receive a zero update. FIG. 9B depicts TSDFs stored in a row of voxels of FIG. 9A. Further, parts of the grid of voxels may not be updated for this depth image, which reduces latency and saves computation power. For example, all voxels not falling into the camera frustum 908 are not updated for this depth image. U.S. patent application Ser. No. 16/229,799 describes culling portions of a grid of voxels for fast volumetric reconstruction, which is incorporated herein in its entirety.

In some embodiments, a depth image may contain ambiguous data, which makes an XR system uncertain about whether to update corresponding voxels. In some embodiments, these ambiguous data may be used to accelerate creation and updating of a 3D representation of an XR environment, instead of discarding the ambiguous data and/or requesting a new depth image. These techniques described herein enable creation and updating of a 3D representation of an XR environment with low usage of computational resources. In some embodiments, these techniques may reduce artifacts at the output of an XR system due to, for example, time latency caused by a delay until update information is available or caused by delays associated with heavy computing.

Figure 10:
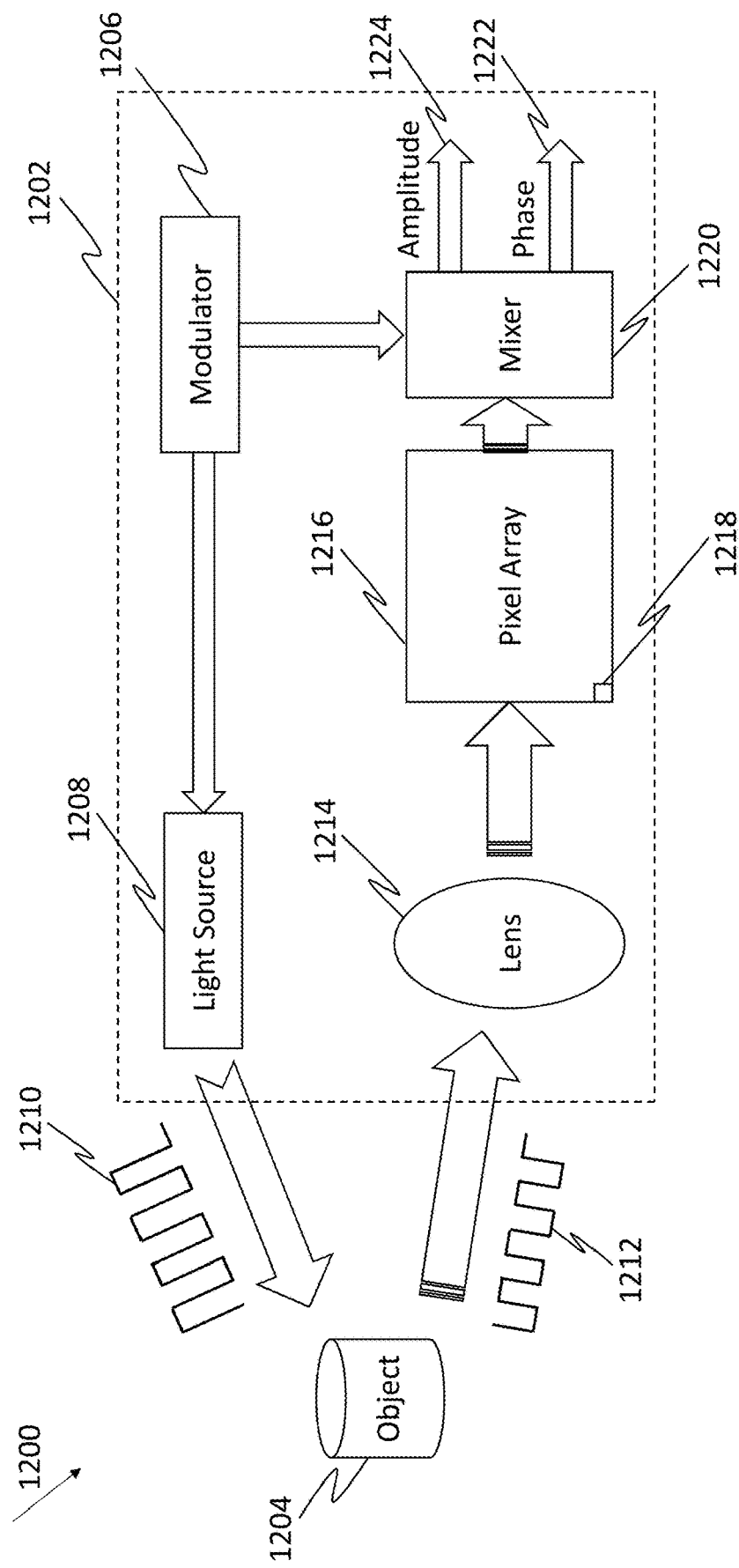
FIG. 10 is a schematic diagram illustrating an exemplary depth sensor, according to some embodiments.

FIG. 10 depicts an exemplary depth sensor 1202, which may be used to capture the depth information of an object 1204, according to some embodiments. The sensor 1202 may include a modulator 1206 configured to modulate a signal, for example, with a periodic pattern of a detectable frequency. For example, an IR light signal may be modulated with one or more periodic signals at a frequency between 1 MHz to 100 MHz. A light source 1208 may be controlled by modulator 1206 to emit light 1210 modulated with a pattern of one or more desired frequencies. Reflected light 1212, reflected by the object 1204, may be gathered by a lens 1214 and sensed by a pixel array 1216. The pixel array 1216 may include one or more pixel circuits 1218. Each pixel circuit 1218 may produce data for a pixel of an image output from the sensor 1202, corresponding to light reflected from an object in a direction with respect to the sensor 1202.

A mixer 1220 may receive a signal output from the modulator 1206 such that it may act as a down converter. The mixer 1220 may output one or more phase images 1222 based on, for examples, phase shifts between the reflected light 1212 and the emitted light 1210. Each image pixel of the one or more phase images 1222 may have a phase based on time for the emitted light 1210 to travel from the light source to a surface of the object and back to the sensor 1202. The phase of a light signal may be measured by a comparison of the transmitted and reflected light, for example, at four points, which may correspond to multiple, such as four, locations over a cycle of the signal from the modulator 1206. An average phase difference at these points may be computed. A depth from the sensor to the point of the object surface reflected the light wave may be computed based on the phase shift of the reflected light and the wavelength of the light.

The output of the mixer 1220 may be formed into one or more amplitude images 1224 based on, for example, one or more peak amplitudes of the reflected light 1212, as measured at each of the pixels in the array 1216. Some pixels may measure reflected light 1212 with low peak amplitudes, for example, lower than a predetermined threshold, which may correlate with large noise. The low peak amplitudes may be caused by one or more of various reasons including, for example, poor surface reflectivity, a long distance between the sensor and the object 1204, and the like. Therefore, low amplitudes in an amplitude image may indicate low confidence levels of depths indicated by corresponding pixels of the depth image. In some embodiments, these pixels of the depth image associated with low confidence levels may be determined as invalid. Other criteria, instead of or in addition to low amplitude, may be used as an indication of low confidence. In some embodiments, asymmetry of the four points for phase measurement may indicate low confidence. Asymmetry may be measured, for example, by a standard deviation of the one or more phase measurements over a period. Other criteria that may be used to assign a low confidence may include over saturation and/or undersaturation of a pixel circuit. On the other hand, the pixels of the depth image that have depth values associated with confidence levels higher than the threshold may be assigned as valid pixels.

Figure 11:
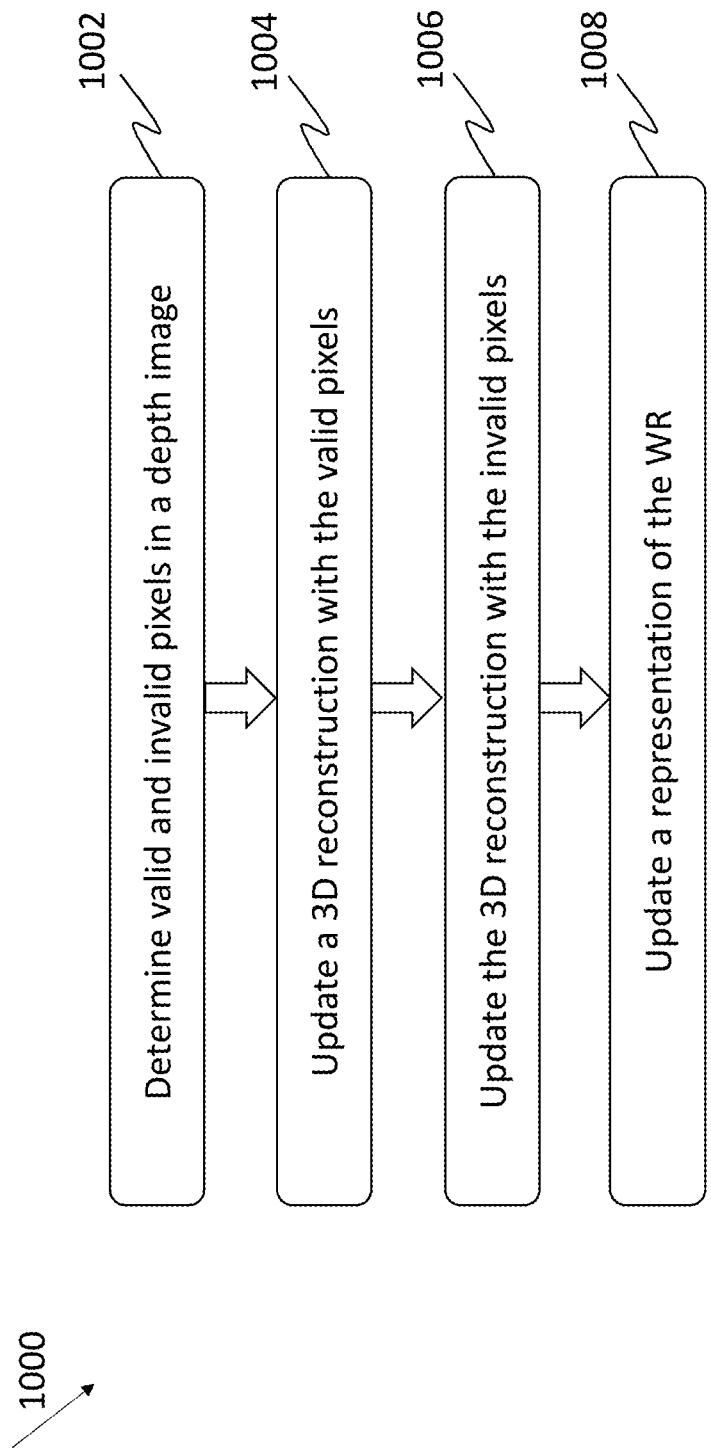
FIG. 11 is a flow chart illustrating an exemplary method of operating an XR system to reconstruct a 3D environment, according to some embodiments.

FIG. 11 depicts a method 1000 of operating an XR system to reconstruct a 3D environment, according to some embodiments. The method 1000 may start by determining (Act 1002) valid and invalid pixels in a depth image. Invalid pixels may be defined selectively to encompass ambiguous data in a depth image using, for example, heuristic criteria, or to otherwise assign such a low confidence to a distance assigned to a voxel such that the voxel may not be used in some or all processing operations. In some embodiments, the invalid pixels may be caused by one or more of various reasons including, for example, a shining surface, measurements made on surfaces out of a sensor's operation range, computation error due to asymmetry of captured data, over saturation or undersaturation of a sensor, and the like. Any or all of the above, or other criteria may be used to invalidate pixels in the depth image.

Figure 12:
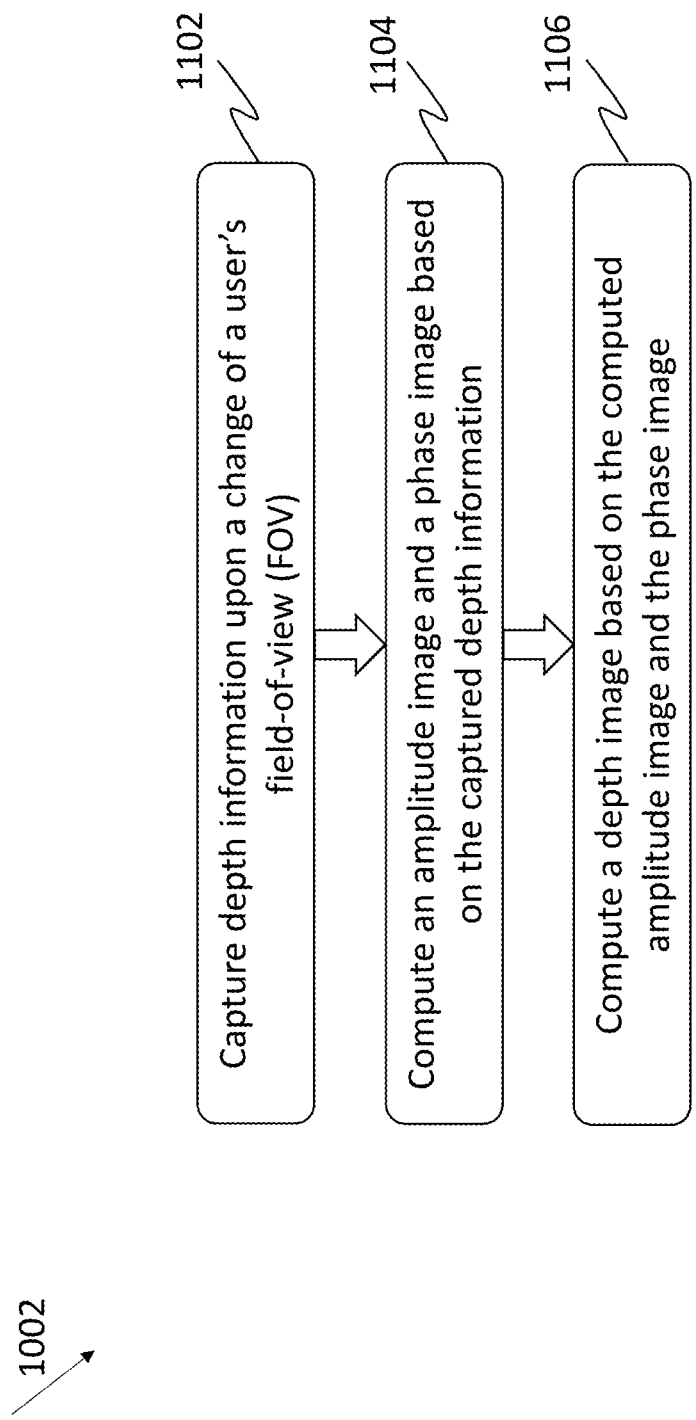
FIG. 12 is a flow chart illustrating an exemplary method of determining valid and invalid pixels in a depth image in FIG. 11, according to some embodiments.

FIG. 12 depicts a method 1002 of determining valid and invalid pixels in a depth image, according to some embodiments. The method 1002 may include capturing (Act 1102) depth information (e.g., infrared intensity images) upon a change of a field-of-view of a user caused by, for example, motions of headpose, user location, and/or physical objects in the environment. The method 1002 may compute (Act 1104) one or more amplitude images and one or more phase images based on the captured depth information. The method 1002 may compute (Act 1106) a depth image based on the computed one or more amplitude images and the one or more phase images such that each pixel of the depth image has an associated amplitude, which may indicate a confidence level of a depth indicated by the pixel of the depth image.

Returning to FIG. 11, processing may be based on valid and invalid pixels. In some embodiments, pixels that have confidence levels below a threshold, or that otherwise fail validity criteria and/or meet invalidity criteria may be set as invalid pixels. Other pixels may be deemed valid. In some embodiments, pixels that have confidence levels above a threshold, or that otherwise pass validity criteria and/or meet validity criteria may be set as valid pixels. Other pixels may be deemed invalid. The method 1000 may update (Act 1004) a 3D reconstruction of an XR environment based on the valid pixels and/or the invalid pixels. The grid of voxels, such as is shown in FIG. 9A, may be computed from the pixels. Surfaces in the environment may be computed from the grid of voxels using, for example, a marching cubes algorithm. These surfaces may be processed to identify foreground objects and other objects. The foreground objects may be stored in a way that allows them to be processed and updated relatively quickly. For example, the foreground objects may be stored in an object map, as described above.

Figure 13:
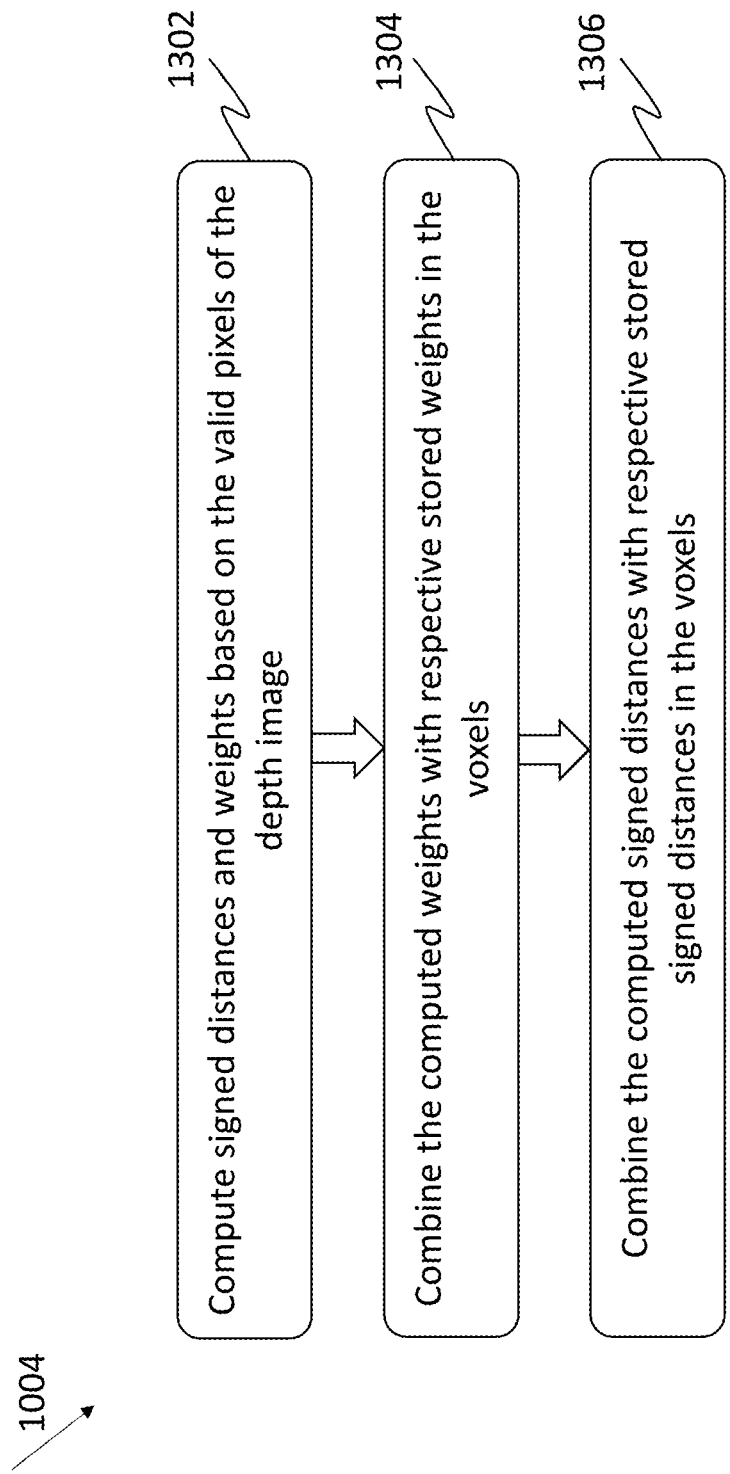
FIG. 13 is a flow chart illustrating an exemplary method of updating a 3D reconstruction with valid pixels in FIG. 11, according to some embodiments.

In some embodiments, the foreground object map may be updated using different data to add objects to the map than to remove objects from the map. For example, only valid pixels may be used for adding objects, while some invalid pixels may be used to remove objects. FIG. 13 depicts a method 1004 of updating a grid of voxels with valid pixels of a depth image measured by a sensor, according to some embodiments. In the example of FIG. 13, the signed distances and weights assigned to each voxel may be computed, as each new depth sensor measurement is made based on, for example, a running average. That average may be weighted to favor more recent measurements more heavily than prior measurements and/or to favor measurements with higher confidence. Moreover, in some embodiments, measurements that are deemed invalid may not be used for updating at all. The method 1004 may include computing (Act 1302) signed distances and weights based on the valid pixels of the depth image, combining (Act 1304) the computed weights with respective stored weights of the voxels, and combining (Act 1306) the computed signed distances with respective stored signed distances of the voxels. In some embodiments, Act 1306 may be performed after Act 1304 and based on the combined weights of Act 1304. In some embodiments, Act 1306 may be performed before Act 1304. Referring back to FIG. 11, in some embodiments, after updating the 3D reconstruction with the valid pixels, the method 1000 may update (Act 1008) a representation of the 3D reconstruction. As a result of the updating, the representation of the world construction may have a different geometry including, for example, a different mesh model and a global surface with a different shape. In some embodiments, the updating may include removing objects from an object map where the updated voxels indicate that a new object is detected and/or that a previously detected object is no longer present or has moved, such as because a surface behind the previously detected location of object has been detected with a sufficient confidence.

Figure 14B:
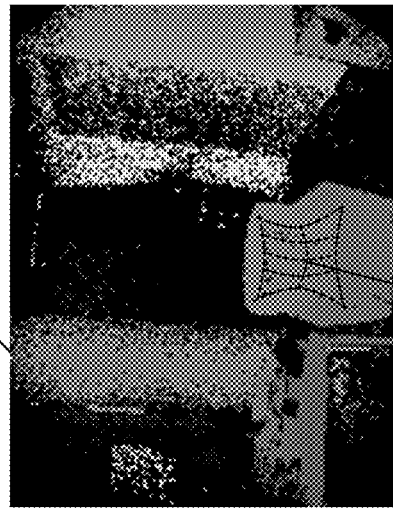
FIG. 14B is the exemplary depth image of FIG. 14A, without the invalid pixels.
Figure 14A:
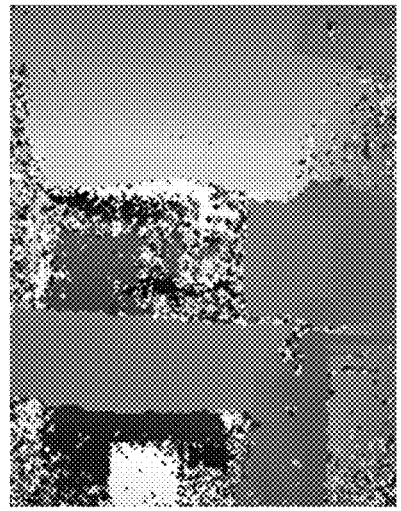
FIG. 14A is an exemplary depth image showing valid and invalid pixels, according to some embodiments.

Some or all of the invalid pixels may also be used in processing to remove objects that were previously detected. An exemplary depth image 1400A is depicted in FIG. 14A, showing both valid and invalid pixels. FIG. 14B depicts an exemplary depth image 1400B, which is the depth image 1400A with the invalid pixels removed. A comparison of FIGS. 14A and 14B shows that an image with invalid pixels has more data than an image with invalid pixels removed. While that data may be noisy, it may be adequate to identify whether objects are present or, conversely, are not present such that more distant surfaces are observed. Thus, data such as is depicted in FIG. 14A may be used to update an object map to remove objects. Such updating may be made with more data and therefore happen more quickly if only data are as depicted in FIG. 14B. As updating to remove objects does not involve inaccurately positioning objects in the map, faster update time may be achieved without risk of introducing errors.

The invalid pixels may be used in any suitable way to remove objects from an object map. For example, separate grids of voxels, computed with only valid pixels, and with both valid and invalid pixels, may be maintained. Alternatively, the invalid pixels may be processed separately to detect surfaces which are then used in a separate step to identify objects in the object map that are no longer present.

In some embodiments, to update a grid of voxels representing a room 1402 shown in the depth image 1400A, each valid pixel in the depth image 1400B may be used to compute values for one or more voxels in the grid. For each of the one or more voxels, a signed distance and weight may be computed based on the depth image. The signed distance stored in association with the voxel may be updated with, for example, a weighted combination of the computed signed distance and the signed distance previously stored in association with the voxel. The weight stored in association with the voxel may be updated with, the voxel. Although the example is described as updating a voxel per one pixel of a depth image, in some embodiments, a voxel may be updated based on multiple pixels of a depth image. In some embodiments, for each voxel in a grid, an XR system may first identify one or more pixels in a depth image that correspond to the voxel, and then update the voxel based on the identified pixels.

Referring back to FIG. 11, regardless of how the invalid pixels are processed, at Act 1006, the method 1000 may update the 3D reconstruction of the XR environment with the invalid pixels. In the illustrated example, before the depth image 1400A being captured, a representation of the room 1402 includes a surface of a cushion on a sofa. In the depth image 1400A, a group of pixels 1404 that correspond to the cushion may be determined as invalid for various possible reasons. For example, the cushion may have poor reflectivity because it is covered with sequins. Act 1006 may update the voxels based on the invalid pixels such that the cushion surface is removed from the representation of the room 1402 if it has been removed, and remained in the representation of the room 1402 if it is still on the sofa but with poor reflectivity because processing only valid pixels would not indicate, or would not indicate quickly or with high confidence, that the cushion is no longer present. In some embodiments, Act 1006 may include inferring a status of a surface based on the depths indicated by the invalid pixels, and removing the cushion from an object map when a surface is detected behind the location where the cushion was previously indicated to be present.

Figure 15:
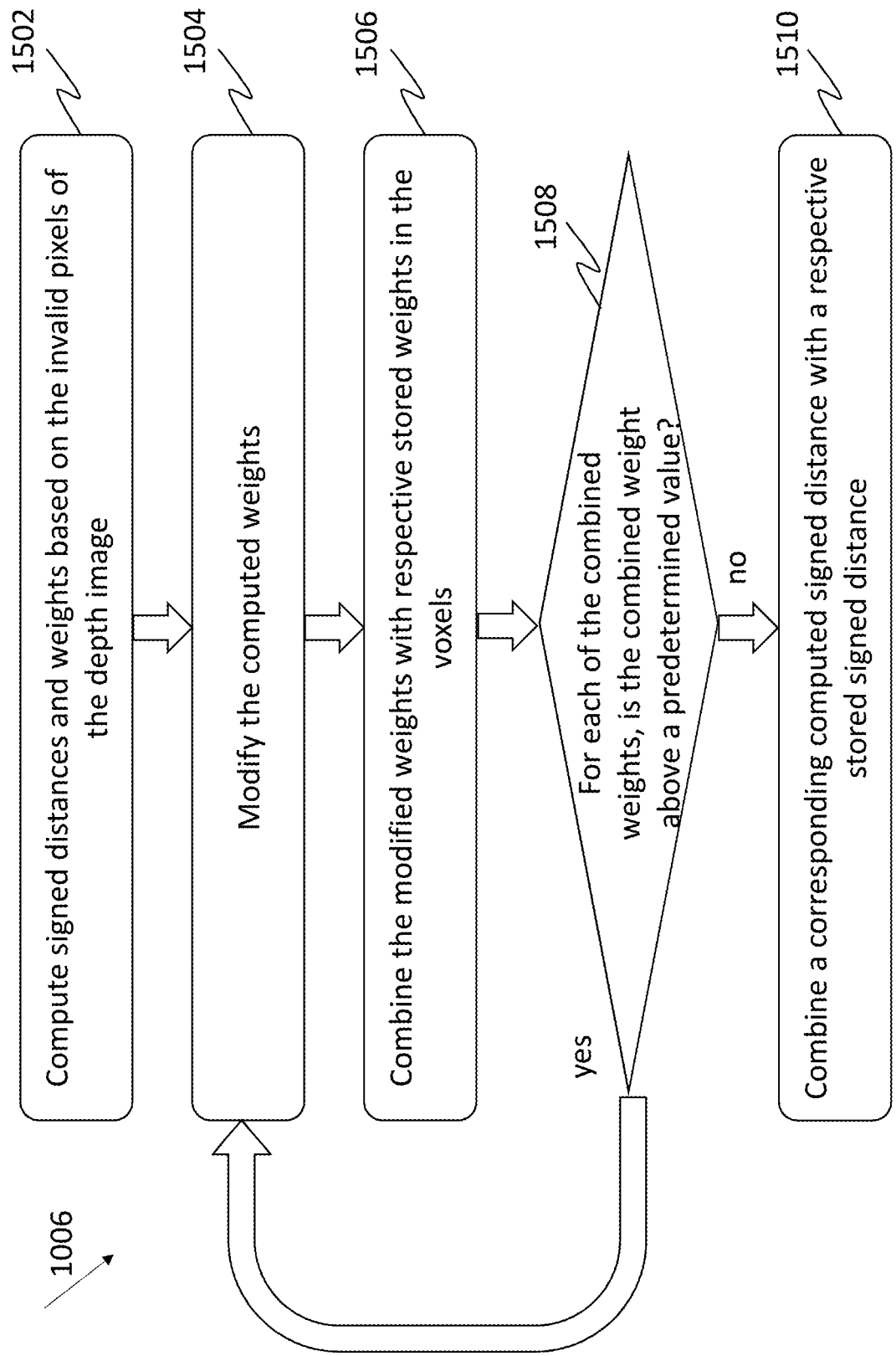
FIG. 15 is a flow chart illustrating an exemplary method of updating the 3D reconstruction with invalid pixels in FIG. 11, according to some embodiments.

FIG. 15 depicts a method 1006 of updating the grid of voxels as new depth images are acquired, according to some embodiments. The method 1006 may start by computing (Act 1502) signed distances and weights based on the invalid pixels of the depth image. The method 1006 may include modifying (Act 1504) the computed weights. In some embodiments, the computed weights may be adjusted based on a time that the depth image is captured. For example, a larger weight may be assigned to a depth image captured more recently.

FIG. 16 depicts a method 1504 of modifying the computed weights, according to some embodiments. The method 1504 may include, for each of the computed weights, determining (Act 1602) whether a discrepancy exists between a corresponding computed signed distance and a respective stored signed distance. When a discrepancy is observed, the method 1504 may decrease (Act 1604) the computed weight. When no discrepancy is observed, the method 1504 may assign (Act 1606) the computed weight as the modified weight. For example, if the cushion is removed too quickly, the invalid pixels in the depth image may include depths larger than previously captured depths of the cushion surface, which may indicate that the cushion is removed. On the other hand, if the cushion is still on the sofa but with poor reflectivity, the invalid pixels in the depth image may include depths comparable to previously captured depths of the cushion surface, which may indicate that the cushion is still on the sofa.

At Act 1506, the method 1006 may combine the modified weights with respective previously-stored weights in the voxels. In some embodiments, for each voxel, the combined weight may be a sum of a previously-stored weight and the modified weight computed from the depth image. At Act 1508, the method 1006 may determine whether each of the combined weight is above a predetermined value. The predetermined value may be selected based on confidence levels of the invalid pixels such that pixels with lower confidence levels have less weight. When the combined weight is above the predetermined value, the method 1006 may further modify the computed weights. When the combined weight is below the predetermined value, the method may proceed to combine (Act 1510) a corresponding computed signed distance with a respective stored signed distance. In some embodiments, the Act 1510 may be omitted if the combined weight alone indicates that a surface corresponding to the pixels should be removed.

In some embodiments, each voxels in the grid of voxels may have a rolling average of the stored weight as new depth images are collected. Each new value is weighted to more quickly show changes that should warrant adding or removing objects from the object map.

In some embodiments, after updating the 3D reconstruction with the invalid pixels, the method 1000 may update (Act 1008) a representation of the world construction. In some embodiments, Act 1008 may remove a surface from the 3D representation of the environment based on the signed distances and weights in the updated pixels. In some embodiments, Act 1008 may add back to the 3D representation of the environment a previously removed surface based on the signed distances and weights in the updated pixels.

In some embodiments, the methods described in connection with FIGS. 11-16 may be performed in one or more processors of an XR system.

Having thus described several aspects of some embodiments, it is to be appreciated that various alterations, modifications, and improvements will readily occur to those skilled in the art.

As one example, embodiments are described in connection with an augmented (AR) environment. It should be appreciated that some or all of the techniques described herein may be applied in an MR environment or more generally in other XR environments, and in VR environments.

As another example, embodiments are described in connection with devices, such as wearable devices. It should be appreciated that some or all of the techniques described herein may be implemented via networks (such as cloud), discrete applications, and/or any suitable combinations of devices, networks, and discrete applications.

As a further example, embodiments are described in connection with sensors based on time-of-flight technology. It should be appreciated that some or all of the techniques described herein may be implemented via other sensors based on any suitable technologies including, for example, stereoscopic imaging, structured light projection, and plenoptic cameras.

Such alterations, modifications, and improvements are intended to be part of this disclosure, and are intended to be within the spirit and scope of the disclosure. Further, though advantages of the present disclosure are indicated, it should be appreciated that not every embodiment of the disclosure will include every described advantage. Some embodiments may not implement any features described as advantageous herein and in some instances. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. In some embodiments, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In the embodiment illustrated, the input/output devices are illustrated as physically separate from the computing device. In some embodiments, however, the input and/or output devices may be physically integrated into the same unit as the processor or other elements of the computing device. For example, a keyboard might be implemented as a soft keyboard on a touch screen. In some embodiments, the input/output devices may be entirely disconnected from the computing device, and functionally integrated through a wireless connection.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosure may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a computer-readable medium that can be considered to be a manufacture (i.e., article of manufacture) or a machine. In some embodiments, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A portable electronic system comprising:
   a depth sensor configured to capture information about a physical world; and
   at least one processor configured to execute computer executable instructions to compute a three-dimensional (3D) representation of a portion of the physical world based at least in part on the captured information about the physical world, wherein the computer executable instructions comprise instructions for:
   computing from the captured information a depth image comprising a plurality of pixels, each pixel indicating a distance to a surface in the physical world;
   determining valid pixels and invalid pixels in the plurality of pixels of the depth image based, at least in part, on the captured information;
   updating the 3D representation of the portion of the physical world with the valid pixels of the depth image; and
   updating the 3D representation of the portion of the physical world with the invalid pixels of the depth image, wherein confidence information is associated with pixels of the depth image, the confidence information indicating confidence in the distance to the surface of the physical world indicated by a respective pixel, and the invalid pixels have lower confidence than the valid pixels.

2. The portable electronic system of claim 1, wherein:
computing the depth image comprises computing confidence levels about the distances indicated by the plurality of pixels, and
determining the valid pixels and the invalid pixels comprises, for each of the plurality of pixels,
determining whether the corresponding confidence level is below a predetermined value, and
assigning the pixel as an invalid pixel when the corresponding confidence level is below the predetermined value.

3. The portable electronic system of claim 1, wherein:
updating the 3D representation of the portion of the physical world with the valid pixels comprises modifying a geometry of the 3D representation of the portion of the physical world with the distances indicated by the valid pixels.

4. The portable electronic system of claim 1, wherein:
updating the 3D representation of the portion of the physical world with the valid pixels comprises adding an object to an object map.

5. The portable electronic system of claim 4, wherein:
updating the 3D representation of the portion of the physical world with the invalid pixels comprises removing an object from the object map.

6. The portable electronic system of claim 1, wherein:
updating the 3D representation of the portion of the physical world with the invalid pixels comprises removing one or more reconstructed surfaces from the 3D representation of the portion of the physical world based, at least in part, on the distances indicated by the invalid pixels.

7. The portable electronic system of claim 6, wherein:
the one or more reconstructed surfaces are removed from the 3D representation of the portion of the physical world when the distances indicated by the corresponding invalid pixels are out of an operation range of the sensor.

8. The portable electronic system of claim 6, wherein:
the one or more reconstructed surfaces are removed from the 3D representation of the portion of the physical world when the distances indicated by the corresponding invalid pixels indicate the one or more reconstructed surfaces move farther away from the sensor.

9. The portable electronic system of claim 1, wherein:
the sensor comprises
a light source configured to emit light modulated at a frequency;
a pixel array comprising a plurality of pixel circuits and configured to detect a reflected light at the frequency by an object; and
a mixer circuit configured to compute an amplitude image of the reflected light, indicating amplitudes of the reflected light detected by the plurality of pixel circuits in the pixel array, and a phase image of the reflected light, indicating phase shifts between the reflected light and the emitted light detected by the plurality of pixel circuits in the pixel array, wherein:
the depth image is computed based, at least in part, on the phase image.

10. The portable electronic system of claim 9, wherein:
determining the valid pixels and the invalid pixels comprises, for each of the plurality of pixels of the depth image,
determining whether a corresponding amplitude in the amplitude image is below a predetermined value, and
assigning the pixel as an invalid pixel when the corresponding amplitude is below the predetermined value.

11. At least one non-transitory computer-readable medium encoded with a plurality of computer-executable instructions that, when executed by at least one processor, perform a method for providing a three-dimensional (3D) representation of a portion of a physical world, the 3D representation of the portion of the physical world comprising a plurality of voxels corresponding to a plurality of volumes of the portion of the physical world, the plurality of voxels storing signed distances and weights, the method comprising:
capturing information about the portion of the physical world upon a change within a field-of-view of a user;
computing a depth image based on the captured information, the depth image comprising a plurality of pixels, each pixel indicating a distance to a surface in the portion of the physical world;
determining valid pixels and invalid pixels in the plurality of pixels of the depth image based, at least in part, on the captured information;
modifying the 3D representation of the portion of the physical world by using the valid pixels to add and remove surfaces in the 3D representation; and
modifying the 3D representation of the portion of the physical world by using the invalid pixels, selectively, to remove surfaces in the 3D representation.

12. The at least one non-transitory computer-readable medium of claim 11, wherein:
the captured information comprises confidence levels about the distances indicated by the plurality of pixels, and
determining the valid pixels and invalid pixels comprises, for each of the plurality of pixels, determining whether the corresponding confidence level is below a predetermined value, and
assigning the pixel as an invalid pixel when the corresponding confidence level is below the predetermined value.

13. The at least one non-transitory computer-readable medium of claim 11, wherein modifying the 3D representation of the portion of the physical world by using the valid pixels comprises
computing signed distances and weights based, at least in part, on the valid pixels of the depth image,
combining the computed weights with respective stored weights in the voxels and storing the combined weights as the stored weights, and
combining the computed signed distances with respective stored signed distances in the voxels and storing the combined signed distances as the stored signed distances.

14. The at least one non-transitory computer-readable medium of claim 11, wherein modifying the 3D representation of the portion of the physical world by using the invalid pixels comprises:
computing signed distances and weights based, at least in part, on the invalid pixels of the depth image, the computing comprising:
modifying the computed weights based on a time that the depth image is captured,
combining the modified weights with respective stored weights in the voxels, and
for each of the combined weights, determining whether the combined weight is above a predetermined value.

15. The at least one non-transitory computer-readable medium of claim 14, wherein modifying the computed weights comprises, for each of the computed weights, determining whether a discrepancy exists between a computed signed distance corresponding to the computed weight and a respective stored signed distance.

16. The at least one non-transitory computer-readable medium of claim 15, wherein modifying the computed weights comprises, when it is determined the discrepancy exists, decreasing the computed weight.

17. The at least one non-transitory computer-readable medium of claim 15, wherein modifying the computed weights comprises, when it is determined no discrepancy exists, assigning the computed weight as the modified weight.

18. The at least one non-transitory computer-readable medium of claim 14, wherein modifying the 3D representation of the portion of the physical world by using the invalid pixels comprises, when the combined weight is determined to be above the predetermined value, further modifying the computed weight based on the time that the depth image is captured.

19. The at least one non-transitory computer-readable medium of claim 14, wherein modifying the 3D representation of the portion of the physical world by using the invalid pixels comprises, when the combined weight is determined to be below the predetermined value, storing the combined weight as the stored weight, combining a corresponding computed signed distance with a respective stored signed distance, and storing the combined signed distance as the stored signed distance.

20. A method of operating a cross reality (XR) system to reconstruct a three-dimensional (3D) environment, the XR system comprising a processor configured to process image information in communication with a sensor worn by a user that captures information for respective regions in a field of view of the sensor, the image information comprising a depth image computed from the captured information, the depth image comprising a plurality of pixels, each pixel indicating a distance to a surface in the 3D environment, the method comprising:
    determining the plurality of pixels of the depth image as valid pixels and invalid pixels based, at least in part, on the captured information;
    updating a representation of the 3D environment with the valid pixels; and
    updating the representation of the 3D environment with the invalid pixels such that the representation of the 3D environment comprises information of the invalid pixels, wherein the information of the invalid pixels indicates distances from the sensor to surfaces in the 3D environment for which a confidence is below a threshold.

21. The method of claim 20, wherein updating the representation of the 3D environment with the valid pixels comprises modifying a geometry of the representation of the 3D environment based, at least in part, on the valid pixels.

22. The method of claim 20, wherein updating the representation of the 3D environment with the invalid pixels comprises removing a surface from the representation of the 3D environment based, at least in part, on the invalid pixels.

* * * * *